United States Patent [19]

Keith

[11] Patent Number: 5,565,755
[45] Date of Patent: Oct. 15, 1996

[54] CHARGING BATTERIES OF ELECTRIC VEHICLES

[76] Inventor: Arlie L. Keith, Rt. 2, Box 93b, Laurel Springs, N.C. 28644

[21] Appl. No.: 474,291

[22] Filed: Jun. 7, 1995

Related U.S. Application Data

[62] Division of Ser. No. 49,053, Apr. 19, 1993, Pat. No. 5,462,439.

[51] Int. Cl.⁶ ............................ B60L 1/02; H01M 10/46
[52] U.S. Cl. ............................................. 320/2; 219/202
[58] Field of Search ................................. 320/2, 35, 36, 320/39, 40; 219/202, 205, 258, 386

[56] References Cited

U.S. PATENT DOCUMENTS

| | | | |
|---|---|---|---|
| 3,270,267 | 8/1966 | Nolte, Jr. | 320/56 |
| 3,273,038 | 9/1966 | Miller | 320/2 |
| 3,529,229 | 9/1970 | Kennedy | 320/2 |
| 3,596,018 | 7/1971 | Elmes | 320/2 |
| 3,603,860 | 9/1971 | Johnson | 320/2 |
| 4,496,896 | 1/1985 | Melocik et al. | 320/2 |
| 4,926,106 | 5/1990 | Tanis | 219/202 X |
| 5,049,802 | 9/1991 | Mintus et al. | 320/2 |
| 5,115,116 | 5/1992 | Reed | 219/202 |
| 5,462,439 | 10/1995 | Keith | 320/2 X |

*Primary Examiner*—Edward H. Tso
*Attorney, Agent, or Firm*—M. P. Williams

[57] ABSTRACT

An electric vehicle having a computer for controlling the charging of its battery includes a probe adapted to connect with a receptacle on a charging station which has a computer for controlling the charging voltage provided over the connection to the vehicle. In response to the vehicle announcing its presence with a broadcast signal, the charge station receptacle may be raised until it senses a laser signal presented by the vehicle to indicate alignment of the receptacle with the vehicle probe. The vehicle and station communicate over a current loop to establish battery type and voltage, method of payment and credit card number, as well as the cost basis for the power. When communications are complete, the system switches over to utilize the same connections for the charging current. The computers include stop modes which they rest in, and to which they return if performance of vehicle and station diagnostics (respectively) indicate inoperability or if other faults occur. The vehicle charges the battery in a short program triggered by a AC voltage zero crossing interrupt, the background program of which determines when charging should cease because the battery is full, a switch has been operated, or because excessive voltage or current has been sensed. The charged voltage is adjusted by motor driven autotransfer in response to a computer servoprogram. Many probe, receptacle and operational details assure safe, easy, automated operation.

6 Claims, 30 Drawing Sheets

VEHICLE

CHARGING BATTERIES OF ELECTRIC VEHICLES

This is a division of now copending application Ser. No. 08/049,053 filed Apr. 19, 1993 now U.S. Pat. No. 5,462,439.

Technical Field

This invention relates to electric vehicles which are operated with a battery and charging stations to which the vehicles may be presented for a charge when connected thereto, and ancillary methodology.

BACKGROUND ART

The need to reduce pollution based upon carbon fuel consumption in vehicles is accelerating the thrust toward electric vehicles for use by the general public. It has long been known that a key problem is the way to recharge batteries frequently. Although battery charging has been known for many decades, most battery charging effort has been directed to charging the batteries of carbon fueled vehicles and charging the batteries of industrial vehicles such as forklifts and robots. Charging batteries for carbon fueled vehicles is mainly as a result of or following the correction of a fault in the charging system or the battery. Charging industrial vehicle batteries is accomplished in generally controlled environments with batteries of basically only a single type, on known vehicles and involving trained personnel.

Battery charging for primary motive power by the public in general is a wholly different matter. First, such systems should be arranged to minimize potential for electric shock to persons in the vicinity. The system should be designed to be as immune as possible to damage from repetitive normal use or predictable abnormal treatment. The systems should permit vehicles to readily engage a charging station, in a uniform manner to permit the maximum number of vehicles to use a maximum number of available charging stations (at least those that are available to the public at large). While vehicles will typically be charged when unused and parked at their home bases, they also will require obtaining charges that must be paid for at public and private commercial and municipal charging stations. Vehicles may be connected for a charge by means of a wire cable, such as that shown for a carbon fueled vehicle in U.S. Pat. No. 3,270,267. A more likely approach, however, may be to permit entering a station for a charge without the need for the operator to connect a cable. In U.S. Pat. No. 3,529,229, a probe mounted under a vehicle is inserted into a funnel shaped receptacle which is allowed to slide on bearings so as to accommodate minor misalignment of the vehicle with respect to the receptacle. In U.S. Pat. No. 3,596,018, a receptacle on the vehicle is funnel shaped and protected by spring loaded doors which can be pushed out of the way by a probe mounted on the charging station. The probe is mounted on springs so as to allow it to move slightly in any direction to accommodate a slight misalignment between the car and the vehicle. However, it will accommodate only a vehicle having its receptacle mounted at a standard height from the ground. Said patent also includes a probe which is disconnected from power until it is pushed by contact with the vehicle so as to make contact with the power of the station. While this renders it relatively safe from electrical shock to passersby, it does not protect the probe itself, and particularly the contacts thereof, from damage. A metal contact for an industrial tractor to be charged is illustrated in U.S. Pat. No. 3,273,038. An inductive coupling for charging an industrial vehicle is shown in U.S. Pat. No. 4,496,896. Spring loaded rubber shrouds are shown in U.S. Pat. No. 3,603,860; the shrouded probes are adapted to mate with conductive slots in, essentially, the bumper of the industrial vehicle.

All the foregoing notions have little to do with the need for the general public to have reliable, easy to use, generally available battery charging capability.

DISCLOSURE OF INVENTION

Objects of the invention include charging of electric vehicle batteries for the general public including having stations readily available to all types of vehicles, ease of use by the operator, safety for operators, charging stations and vehicles, and the capability to receive charges even though something may have gone wrong.

According to the present invention, a vehicle requiring a battery charge is connected to a charging station, such as through a medium that supports both communications and charging currents and which may be switched from communications to use for charging. The communications may include a current loop (such as the UART RS323 disclosed herein), which can be monitored for activity to ensure that it is working. Information such as battery type and/or voltage, if the payment is to be made by cash or credit (debit) card and the number thereof, may be sent from the vehicle to the station, and the station may communicate power cost basis to the vehicle. In the invention, a vehicle is switched to receive charging current and waits for the station, which determines that there is no current in the connection before connecting to power mains. After connection, the station will disconnect from the power mains in response to sensing excess current or voltage. The vehicle can isolate the battery from the connection if voltage is excessive unless the operator overrides to permit utilization of any AC voltage which is available.

According to the invention, the station and vehicle use computers which have a stop mode in which the only function performed is to respond to an external interrupt to resume operation, the vehicle computer being turned on when the engine is on and the station computer being turned on in response to sensing the presence of a vehicle, such as through a signal broadcast by the vehicle. The computers perform diagnostics on their respective systems and can resume the stop mode if the diagnostics are unsuccessful, although the vehicle itself can override the stop mode for the vehicle computer. Displays indicate whether the systems are operative or not. A static display powered by the main power mains which is set to operate by the computer before it resumes the stop mode may advise customers that the station is closed. The computers are utilized to set up the charge including such things as battery information and how payment is to be made (if at all). And the computers monitor the progress of the charge so as to permit the station to cut off the power when cash is exhausted, to permit the vehicle operator to stop the charge as he (or she) sees fit, and to stop when charging is complete.

In accord with the invention, the contacts on the vehicle and the station may become coaligned by moving one of the sets of contacts in response to a directional signal, such as a laser. One of the sets of contacts may be mounted in the probe and the other set mounted in a corresponding receptacle. Doors on the receptacle may be opened automatically in response to the vehicle approaching a station for a charge; the doors may have rollers thereon and may be partially closed on the probe itself after the probe is inserted, to provide some measure of protection during the charge. The probe may be contained in a case having doors which push out of the way as the probe is extended by a pneumatic cylinder. The cylinder may have a tube associated therewith to guide contact wires as the probe is moved. The probe has a shroud which is resiliently disposed over a central contact on the end thereof, the shroud containing other contacts, pushing on the contacts of the shroud causing it to retract and expose the central contact. In one embodiment, motion of the shroud causes it to rotate, thereby providing a wiping contact between the contacts thereon and corresponding contacts in the receptacle; similarly, a spring loaded contact in the receptacle may rotate when it is removed in response to pressure from the corresponding contact of the probe, thereby providing a wiping contact therebetween. The rotation may occur as a result of threads or cam service and guides such as studs, male and female.

In accordance with the invention, when a vehicle is presented to a station for a charge, the operator is instructed by a display to operate the vehicle to enter the station while at the same time it places the vehicle in a very slow creep mode. Force exerted between the vehicle contacts and the station contacts is monitored, and a threshold force causes the vehicle to be disabled and the brakes to be set. According to the invention, the probe may be pointed toward the receptacle to correct for misalignment between the vehicle and the station; pointing of the probe manually or by a motor may be accommodated by a roller thereon which engages a track. The probe may be flexible, either having pivots or a limber member, such as a neoprene rubber tube. The receptacle may be pivoted in one or more directions or mounted on a gimbal, and can be dampened and restored to a neutral position by means of a resilient cushion.

In accordance with the invention, the station has a transformer, thus avoiding the weight thereof on the vehicle; to accommodate various vehicle batteries, the transformer preferably is a motor driven autotransformer having a servo methodology controlled by the computer. The vehicle includes rectifiers and selectively operable switches (such as SCRs) so as to permit utilizing voltages (such as house current) other than from a charge station when necessary on an emergency basis. Charging of the battery is achieved in a program triggered by a voltage zero crossing interrupt that therefore synchronizes the charging to the alternating voltage provided to the vehicle; the program avoids charging when battery temperature is too high or voltage is excessive. A background program, which is run constantly other than during the zero crossing interrupt, determines when charging should cease, either because the battery is full, a switch has been thrown, or there is excess voltage or current in the system. The vehicle may contain heaters which the operator can designate to be turned on at a particular time while the vehicle is connected to the charging station, thereby to heat the cabin from ground base power.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 2 station power up;
FIG. 3 vehicle power up;
FIG. 4 vehicle payment/battery initiation;
FIG. 5 vehicle heat/engage;
FIG. 6 station positioning;
FIG. 7 station setup;
FIG. 8 vehicle setup;
FIG. 9 station payment;
FIG. 10 vehicle payment;
FIG. 11 station battery;
FIG. 12 vehicle battery;
FIG. 13 station switchover;
FIG. 14 vehicle switchover;
FIG. 15 station charge;
FIG. 16 vehicle charge; and
FIG. 17 vehicle zero crossing interrupt.

BEST MODE FOR CARRYING OUT THE INVENTION

The electronic control of vehicle charging is described with respect to FIGS. 1–17, hereinafter. The details of the vehicle probe and the charge station receptacle, which cooperate to connect the vehicle to the charge station in order to receive a charge, are all described with respect to FIGS. 18–35 hereinafter. There are many details of the probe and receptacle which can be utilized without other details thereof, and which can be utilized without use of the details of the electronic control of charging described in FIGS. 1–17. Similarly, there are many features described in FIGS. 1–17 which may be utilized one without the other, and with or without use of the details of the probe and receptacle illustrated in FIGS. 18–35.

Figure 1:
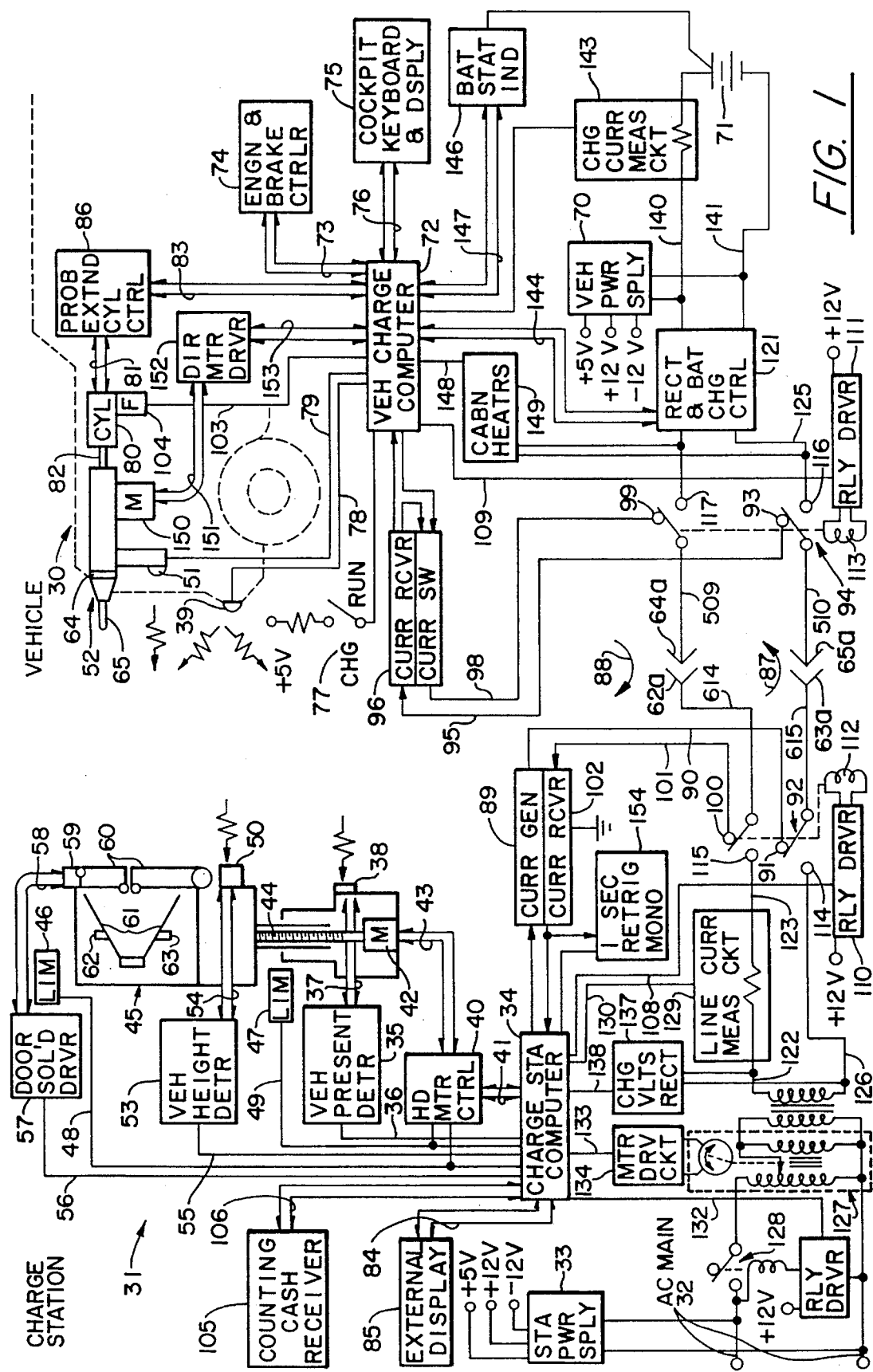
FIG. 1 is a stylized, schematic block diagram of apparatus incorporating the present invention.

Referring now to FIG. 1, an electric vehicle 30 including a battery charging system therefor is shown to the right of the figure, and a charge station 31 with which the vehicle can interconnect to have its batteries charged, is shown to the left of the figure. Power for the charge station 31 is supplied from an AC main 32 which is connected directly to a station power supply 33 which, in this embodiment, supplies +5 volts and ±12 volts for operating various circuits. The power supply 33 is connected directly to the AC main 32 so as to permit providing standby power to a charge station computer 34 and to a vehicle present detector 35 while the remainder of the charge station 31 is in a quiescent state, waiting for a vehicle to approach it for a charge. The charge station computer 34 preferably is of the type that has a standby mode in which it consumes extremely low power, and the only function it can perform in that mode is to react to an interrupt or a reset which will cause it to become active. This may comprise a Motorola MC68HC11 microcomputer, or any other suitable computer which can perform the essential functions of the invention, as described hereinafter. In this case, the interrupt is provided by a vehicle present detector 35 on a line 36. The vehicle present detector 35 is connected by a pair of lines 37 to an infrared sensor 38 which responds to infrared radiation broadcast by an infrared transmitter 39 on the vehicle 30, when the vehicle approaches the station for a charge. Once the computer 34 responds, it will cause a head motor control circuit 40, connected thereto by a trunk of lines 41, to operate a motor 42 in response to signals on lines 43 so as to cause a screw jack arrangement 44 to move a charge probe receptacle head 45 up and down between a pair of limit switches 46, 47, which are connected to the head motor controller 40 and the computer 34 by lines 48, 49, respectively. Initially, the head 45 is driven to the lower limit switch 47 and then is driven upwardly looking for response in a laser detector 50 to a laser beam provided thereto by a laser diode 51 (which may be a common laser pointer) that is mounted on the vehicle 30 a known distance from a probe 52 mounted on the vehicle 30, so as to vertically align the head 45 with the probe 52.

When the detector 50 senses the laser radiation, it communicates with a vehicle height detector 53 via lines 54, which in turn informs the computer 34 via a line 55. The computer 34 will then stop the head drive motor 42, and send a signal on a line 56 to a door solenoid driver 57 to cause signals on lines 58 to operate a solenoid 59 which will rotate gearing (not shown) to open protective doors 60, thereby allowing access to the inside of the head 45. Inside the head there is a funnel-like receptacle 61 that assists in guiding the probe 52 into good electrical connection with an annular contact 62 and a central contact 63 which are adapted for connection with corresponding contacts on the probe 52 which comprise a ring contact 64 and a central conductor 65. The contacts 62–65 thus provide a feed circuit and a return circuit.

Within the vehicle 30, a vehicle power supply 70 which supplies +5 volts and ±12 volts for operating the charge system within the vehicle. The power supply 70 is connected directly to the vehicle battery 71 so as to provide system voltages whenever a battery with sufficient life therein is installed in the vehicle. The vehicle's charge system is controlled by a vehicle charge computer 72 which may be similar to the charge station computer 34, and preferably includes the low power consumption standby mode of such a computer. However, whenever the vehicle is being operated, as may be indicated by signals provided hereto over line 73 from an engine and brake controller 74, the computer 72 may perform system diagnostics and provide indications thereof to the engine and brake controller 74 as well as to the vehicle operator through a cockpit keyboard and display system 75 which is connected to the computer 72 by a trunk of lines 76. The cockpit keyboard and display system 75 may comprise any suitable palm or notebook computer, or other apparatus suited to performing similar functions, as described hereinafter. Assuming that the diagnostics are successful, the vehicle operator can indicate that a battery charge is to be acquired by closing a charge/run switch 77, which may be a discrete switch, or may simply be a suitable keyboard input through the cockpit keyboard and display system 75. It is response to the closing of the charge/run switch 77 (or equivalent) that causes the computer 72 to provide signals on lines 78 and 79 to cause the infrared transmitter 39 and laser diode 51 to emanate radiation, as described hereinbefore.

The computer 72 also provides signals on lines 83 to cause a probe extender cylinder control 86 to operate a low pressure pneumatic cylinder 80 connected thereto by hoses 81 so as to cause a piston rod 82 to extend (and later retract) the probe 52 outwardly from the vehicle 30. The probe 52 is shown partly extended; not shown in FIG. 1 is a probe case including a door to protect the probe from the environment, when not in use. The details of the probe, the receptacle head 45, and their directly associated apparatus are all described with respect to FIGS. 18–35. As described hereinafter, because the probe 52 is extended at the same time that the laser diode 51 begins to radiate, it is a fairly sure bet that the vertical alignment of the head 45 and opening of the doors 60 thereof will not occur until after the vehicle is ready to enter the charge station.

When the doors 60 of the head 45 have been opened, the charge station computer 34 will send signals over a trunk of lines 84 to an external display 85 to cause it to provide a suitable message such as, "Welcome, Enter Slowly". At this point the charge station computer 34 and the vehicle charge computer 72 will attempt to establish communication over an RS232 UART (Universal Asynchronous Receive Transmit) system, which will establish a current loop 87, 88 through the connections made by the contacts 62–65. These contacts are represented in the lower center of FIG. 1 by schematic contacts 62a, 63a, 64a and 65a to show how the contacts 62–65 are connected to the other circuitry. The charge station computer 34 will cause a current generator 89 to attempt to send current (of about 20 ma) along a conductor 90 through the normally closed contact 91 of a relay 92, through the connection made by the contacts 63 and 65, when made, through a normally closed contact 93 of a relay 94 and over a conductor 95 through a current receiver 96 connected to the vehicle charge computer 72. The current receiver 96 is an optically isolated Schmidt trigger, such as an H11L1. At the same time, the vehicle charge computer 72 causes a current switch 97, connected in series with the current receiver 96, to attempt to complete the current loop over a conductor 98, through another normally closed contact 99 of the relay 94 through the contacts 62, 64 and another normally closed contact 100 of the relay 92 and over a conductor 101 to another (similar) current receiver 102 which is connected to the charge station computer 34. The current switch 97 may be an optically coupled photo transistor, such as a 4N31. This is an important aspect of the present invention in three significant ways: this provides instantaneous information of the point in time when connection is made between the contacts 62–65; it provides an optically-isolated communication medium between the vehicle and the station; and it ensures that there is a suitable connection at the contacts 62–65 prior to applying the relatively high voltage electric power through the contacts for charging the vehicle battery. When the vehicle charge computer 72 has its current switch 97 attempting to establish a loop current, it is watching the current receiver 96 to see if current is flowing from the charge station, it sends a signal to the engine and brake controller 74 to cause the car to operate only in a creep mode so as to mitigate the possibility of damaging either the car or the station, and it provides a display to the operator over the cockpit keyboard and display 75 to creep forward so as to attempt to make contact. When it senses current in the loop, it then awaits a signal on a line 103 from a force (or pressure) detector 104 which will indicate that the probe has been forced against pneumatic pressure (or against a spring, depending upon the embodiment) to establish a certain threshold level of pressure between the contacts 62–65, whereby to assure good electrical connection. When the signal on the line 103 indicates that the probe is properly lodged in the head 45, the vehicle charge computer 72 sends signals to the engine and brake controller 74 to shut off the engine and to lock the brakes. Then there is an exchange of information (described hereinafter) between the vehicle and the charge station over the current loop 87, 88 established through the contacts 62–65. This includes information on how the vehicle will pay for the charge (cash, charge card, debit card) and the nature of the battery to be charged, and any other desired information. If payment is by credit (herein including debit) card, information is exchanged with respect thereto; if payment is to be by cash, the operator must then deposit cash into a counting cash receiver 105, which is essentially identical to the cash receiver in vending and change machines that read and register credit for bills inserted therein. This will provide an indication to the charge station computer 34 over lines 106 that a certain amount of cash has been inserted.

When all is in readiness, the charge station computer 34 informs the vehicle charge computer 72, over the current loop 87 that communication is ending and charging is about to begin and the vehicle charge computer 72 responds over current loop 88. Thereafter, both computers 34, 72 will operate corresponding relay drivers 110, 111 to cause related coils 112, 113 to pull the armatures of the relays 92, 94 into connection with the normally open contacts 114–117 thereof. This will cause connection between the secondary winding of an isolation transformer 120 and a rectifier and battery charge control circuit 121 via a plurality of conductors 122–126. The primary winding of the isolation transformer 120 is connected to a motor driven auto transformer 127, which in turn is connected to the AC main 32 through a normally open contact of a relay 128. When the relays 92, 94 are first operated into the charge position, the relay 128 is still open, so there should be no power transferred through the connections 62–65; the current in the conductors 122, 123 is indicated to the charge station computer 34 by means of a line current measuring circuit 129 over a line 130; the station computer 34 determines that there is essentially no current in the conductors 122, 123; if there is more than a negligible amount, the station computer 34 causes the external display 85 to indicate a current limit fault, and the charge is terminated. If there is not more than a negligible amount of current, the station computer 34 sends a signal on the line 132 to close the relay 128 and thereby provide power to the auto transformer 127. The charge station computer 34 then communicates over lines 133 with a motor drive circuit 134 to cause the auto transformer 127 to adjust itself until the voltage across the secondary of the isolation transformer 120 is proper for the battery type which the vehicle has told the charge station must be charged. This voltage is determined by a charge volts rectifier circuit 137 which provides an indication of the voltage to the station computer 34 over a line 138.

The vehicle is now receiving charging power, which is supplied through the connections 62–65 to the rectifier and battery charge control circuit 121, which full wave rectifies the power and selectively applies it over connections 140–141 and through a charge current measuring circuit 143 to the battery 71. The circuit 121 is controlled by the vehicle charge computer 72 over a line 144 which fires a silicon control rectifier (SCR) or the like at a proper firing angle to provide the correct voltage and ensure against overheating in the process of charging the battery 71. The vehicle charge computer 72 cycles through a series of measurements and tests about the charging process, while a zero crossing interrupt is enabled, so that the computer in response to the measurements, can control firing or not and the firing angle of the rectifier and battery charge control circuit 121 in an appropriate fashion. During this time, information about the battery charging process is provided by a battery status indicator 146 over lines 147 to the computer 72, which comprises known temperature and specific gravity measuring devices, that are also typically part of any electric vehicle lead/acid battery/controller subsystem (or other equipment suited to any battery). Also during the charging time, the vehicle charge computer may provide a signal on a line 148 to cause cabin heaters 149 (for heating the interior of the vehicle) to be powered up, if cabin heat has been requested and the time to commence cabin heat has been reached, all as is described more fully hereinafter. The cabin heaters will run on raw unrectified AC power on the lines 124, 125. The charge will continue until something goes awry, the credit established by the counting cash receiver 105 is exhausted, or the operator transfers the charge run switch 77 into the open position as shown; after that, certain displays are made and the vehicle is reenabled so that it can be withdrawn from the charging station.

As disclosed in detail hereinafter, the probe 52 may be pointed forward (in the usual case) or it may be moved to point to the left or to the right. This may be done manually, or it may be driven by a bi-directional motor 150 driven by signals on lines 151 from a direction motor driver 152 controlled by the vehicle charge computer 72 over lines 153. The laser diode 51 is mounted on the probe 52 so that it will point toward the charging station when the probe is properly pointed.

A one second retriggerable monostable multivibrator 154 is connected to the output of the current receiver 102. Its output is connected to an interrupt input to the computer 34. The purpose is to continuously monitor the integrity of the current loop 87, 88, once it is established, until switchover to charging occurs. If good contact is lost, the monostable 154 will time out and cause the loop interrupt, which can terminate the process, as described hereinafter. But so long as messages and/or breaks in line current occur once every second, the time out is reinitiated and no output transition occurs. The loop interrupt is enabled only during pre-charge connect time—during communications and while waiting for the charge start time, as described hereinafter. If desired, a software interrupt or COP (computer operating properly) arrangement may be used instead of the mono 154.

It is assumed that both of the computers 34, 72 will have, in their underlying software, appropriate COP and/or watchdog timer software and hardware protections, and the like, so that either computer will not get locked into loops and be unable to be restored. In view of the fact that both of the computers are small computers and have limited functions to perform (that is to say, the functions performed herein comprise all the work of such computers), and since the software methodology is essentially state dominant, wherein the computers advance from one state to a next depending upon responses thereto, the use of software which has externally dependent loops, with watchdog and COP protection, is suitable. Since these protections are conventional, they are not described herein.

Figure 2:
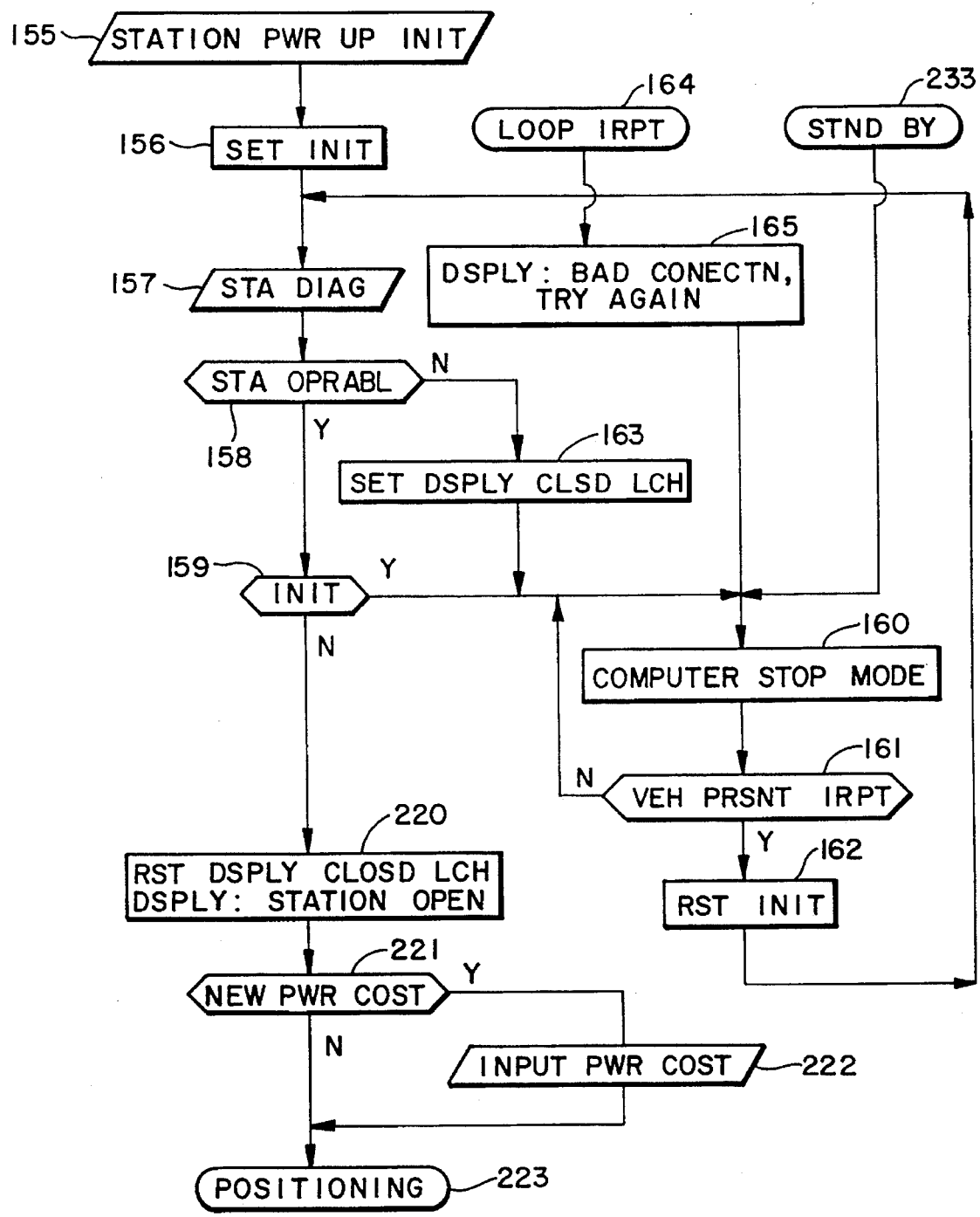
FIGS. 2–17 are logic flow diagrams of subroutines involved in the present invention, as follows.

Referring now to FIG. 2, a basic power on and initialization routine of the charge station computer 34 begins by performing conventional computer power up initialization steps 155. This includes setting and resetting anything that requires an initial state, interrupt masks, signal protocols, normal internal computer diagnostics, and the like, and is not described further. Then a first test 156 will set an initialize flag and the computer enters a subroutine 157 to perform station diagnostics to determine the health and operating condition of the charge station 31. Examples are: monitoring all inputs to the computer 34 to verify proper state; checking the voltages of the station power supply 33; slewing the transformer 127 and measuring volts and amps (137, 129), with relay 92 open and then closed; and so on. Assuming that all is well, a test 158 will sense that the station is operable and an affirmative result thereof will reach a test 159 where the initialize flag is tested. In this first pass through the routine of FIG. 2, the flag will always be set so that an affirmative result of test 159 will reach a point 160 in which the charge station computer enters into a stop mode. In this mode, the power consumption is extremely low and the only function which the computer can perform is to respond to a vehicle present interrupt. In this case, the vehicle present interrupt is established by a signal on a line 36 from the vehicle present detector 35 (FIG. 1). Once in the standby mode, a test 161 determines if an interrupt has occurred; in the usual case it will not have and a negative result of test 161 will retain the program at the stop mode point 160, waiting for a vehicle to approach to receive a charge.

When a vehicle approaches, an affirmative result of test 161 will reach a step 162 in which the initialized flag is reset and then the program reverts to the subroutine 157 to perform station diagnostics and determine if the station is still operable. If not, a negative result of test 158 will reach a step 163 which causes the setting of a latch which will in turn cause the external display 85 (FIG. 1) to display the fact that the station is closed (even after the computer reverts to the standby mode), after which the step 160 will return the system to the standby mode. The display 85 is a static illuminated display powered directly from the AC main 32 under control of the latch, which is external to the computer. If the monostable 154 ever times out while the loop interrupt is enabled (as described hereinbefore), it will reach FIG. 2 through a point 164 and reach a step 165 that tells the operator via display 85 that the connection of the vehicle with the station has failed, and he should try a new approach.

Figure 3:
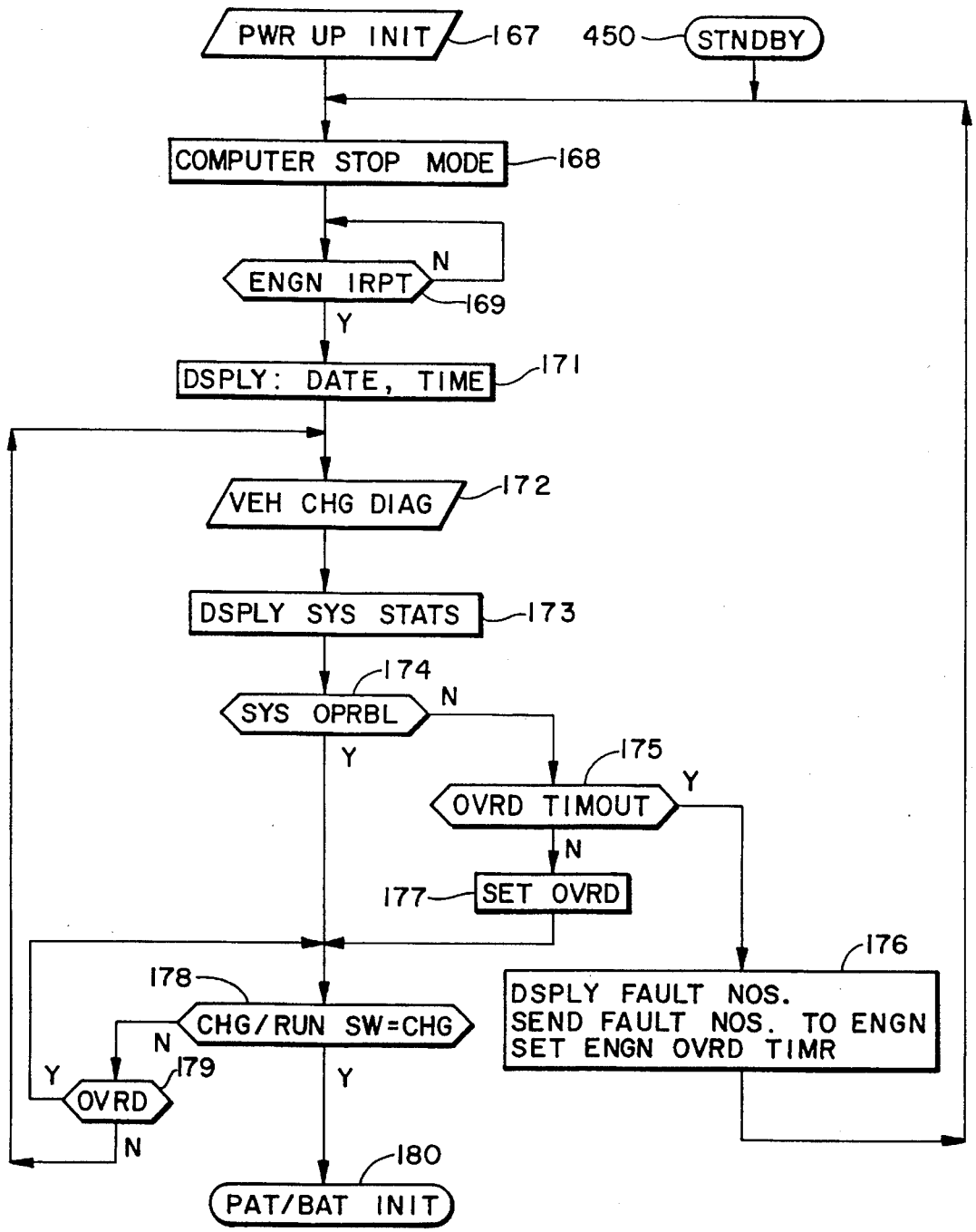

Referring now to FIG. 3, the power up and initialization portion of the program in the vehicle charge computer 72 begins with a subroutine 167 in which the computer 72 is initialized, in the usual fashion. Then a step 168 puts the computer in the standby mode and a test 169 awaits an engine interrupt, from the engine and brake controller 74 (FIG. 1) which occurs when the engine is turned on for normal operation. The computer 72 is therefore in the low power consumption mode when the vehicle is not in use, and the only thing that it can respond to is the engine interrupt.

Once the engine is turned on and an engine interrupt occurs, a positive result of the test 169 will reach a step 171 which causes the date and the time to be displayed on the cockpit keyboard and display unit 75 (FIG. 1). Then the computer performs a subroutine 172 that diagnoses the vehicle charge system (in a fashion similar to that done within the station, described hereinbefore). Examples are vehicle power supply (70) voltages; all computer inputs for appropriate states; battery condition indications; lack of current with relay 94 operated and not operated; and so on. When the diagnostic subroutine 172 is complete, a step 173 causes the status of the system, insofar as relevant, to be displayed to the operator. Then a test 174 determines if the diagnostic results indicate that the system is operable. If it is not, a negative result of the test 174 will reach a test 175 to determine if an override time out has yet occurred; this is a time within which the engine can override the diagnostic failure, if it wishes, as is about to be described. Initially, since the timer has not been set, an affirmative result of the test 175 will reach a series of steps 176 in which the fault numbers are displayed to the operator, the fault numbers are sent to the engine and brake controller 74, and the engine override timer is set. Then the routine again reverts to the step 168 where the computer is put in a standby mode, and then waits at the test 169 for an interrupt. Assuming that the engine and brake controller 74 has determined that any faults indicated by the diagnostics are not significant, the engine controller can reissue the interrupt. It is assumed that this reissuing of the interrupt will occur in a relatively short time, such as ten seconds (for which the engine override timer is set), and therefore, when the test 174 is again reached with a negative result, this time the test 175 will also have a negative result since the timer has not yet timed out, whereby a negative result of the step 175 will reach a step 177 where an override flag is set. Then a test 178 determines if the operator has closed the charge/run switch 77 (FIG. 1) or not. In the usual case, the switch will not have been closed and a negative result of test 178 will reach a test 179 where it is determined whether or not the engine has caused the diagnostic system to be overridden. In the example given, it will have been, and an affirmative result of the test 179 will reach the test 178, whereupon the system will loop between a negative result of test 178 and an affirmative result of test 179 until the operator desires a charge.

On the other hand, if the engine does not reissue the engine interrupt quickly, it is not treated as an override; the next engine interrupt causes an affirmative result of the test 169, any failure of diagnostics will reach an affirmative result of the test 175 and return the system to the standby mode at step 168.

In a normal case, when the diagnostics indicate that the system is operable, an affirmative result of the test 174 will reach the test 178 and until the operator decides to charge the battery, a negative result of test 178 will pass through a negative result of step 179, thereby causing the system to cycle through the vehicle charge system diagnostics over and over again as the vehicle is being driven around, for instance. Ultimately, when the operator decides that a charge is in order, closure of the charge/run switch 77 (FIG. 1) will cause an affirmative result of step 178 which causes the vehicle charge computer 72 to advance to a payment/battery initialization routine illustrated in FIG. 4, through a transfer point 180.

Figure 4:
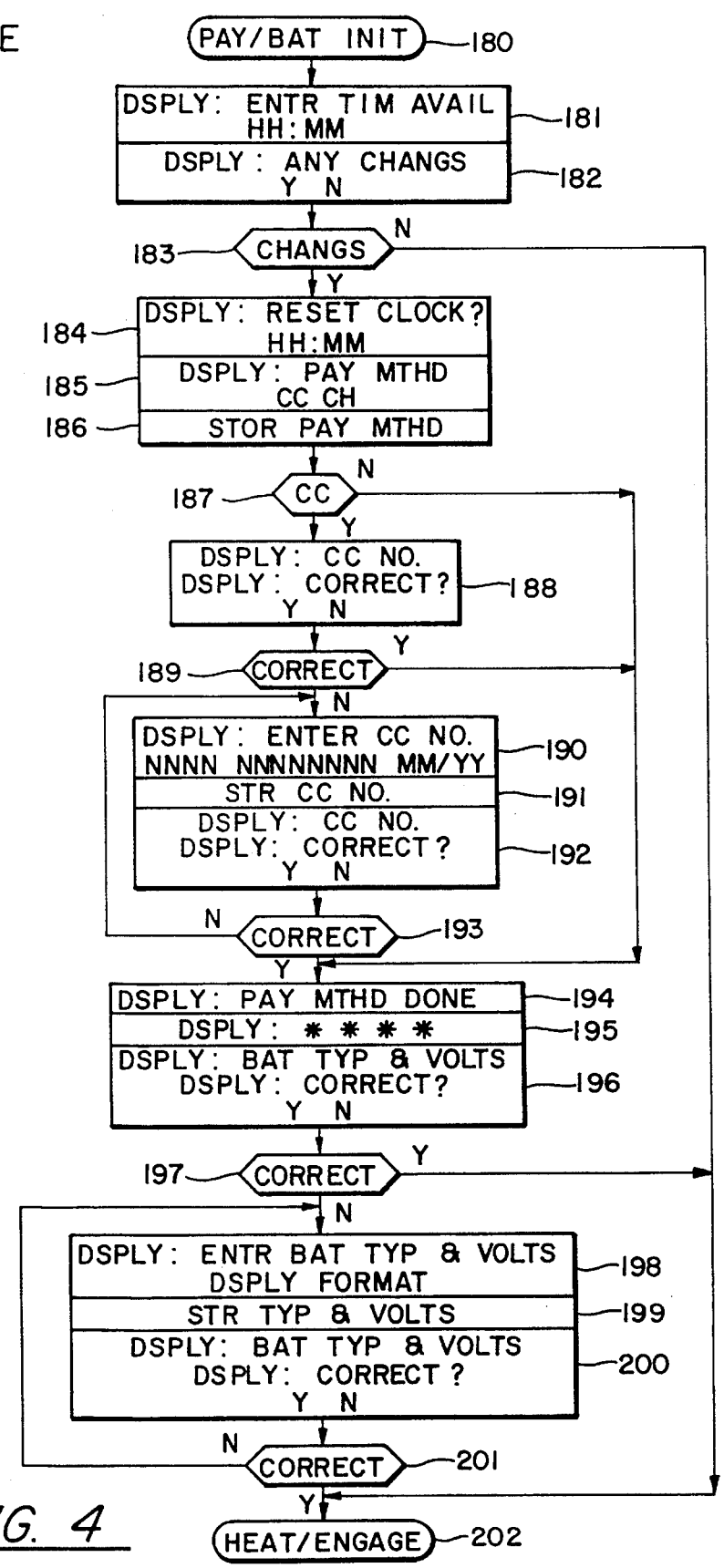

In FIG. 4, a first step causes display of a request to the operator to enter the time which the vehicle has available to receive the charge. It also displays the format in which the time should be entered. In the exemplary embodiment, pressing numbers on the keyboard to represent the hours and tenth of an hour will cause those numbers to appear on the display in the displayed format. If nothing is entered, this will indicate that charging should be accomplished as soon as possible. If (as at home, for instance, eight or ten hours are entered, the charge time may be automatically delayed until cheap power is available) as described hereinafter. Then a step 182 asks the operator if there are any changes since the last time the vehicle had a charge. The operator can reply to that request by pressing the Y or the N, in a usual fashion. Then a test 183 determines what the operator's reply was. If there are changes to be made in the battery configuration or the manner of paying for the charge, an affirmative result of the test 183 will reach a step 184 which asks the operator if he wants to reset the computer's clock, it provides the format of the digital time, and will wait for keystrokes resetting the clock or date, if any, followed by the enter key being pressed. After enter is pressed, a step 185 requests the payment method displaying CC for charge card and CH for cash and inviting the operator to press letter keys to select one or the other. A step 186 will store the response to the request in the step 185, and then a test 187 determines if the method is cash or credit card. Assuming the selected method is by credit card, an affirmative result of test 187 reaches a step 188 in which the previously stored credit card number is displayed, and the question of whether it is the correct number of the card to be used in this transaction is displayed together with Y and N, inviting the operator to keystroke Y or N, depending upon whether it is the correct number of the card to be used in this transaction. Then a test 189 reacts to the operator's response. Assuming that the credit card number is incorrect, a negative result of the test 189 will reach a step 190 where a command is displayed to the operator to enter the credit card number, giving the typical format in which it should be entered. The operator will then make keystrokes entering all the numbers including the expiration date of the credit card. Then a step 191 will store the credit card number for further use and a step 192 will redisplay the stored credit card number with a request to the operator to determine whether it is correct or not, and inviting the operator to select Y or N in dependence thereon. A test 193 then responds to the operator's response. Assuming that the card is still incorrect, a negative result of the test 193 will return the program to the step 188 so that the process can repeat one more time. It should be noted that the process involved in the tests and steps 188–193 is simply causing the operator and the computer to agree on a credit card number; it has nothing to do with whether it is a valid credit card and whether the charges therefrom will be accepted or not. Eventually, a correct credit card number will be presented. In the event that cash is to be used, causing a negative result of test 187 or when a correct credit card causes an affirmative result from either test 189 or 193, a step 194 is reached which displays that the payment method is done. Then a step 195 may be utilized to cause the display to set up a row of asterisks, thereby to emphasize a change from the payment method and credit card information functions to battery information functions.

A step 196 displays the battery type and voltage which the computer has in storage. It also displays a request to determine whether these are correct or not, and the Y and the N to remind the operator to respond to the correctness of the battery type and voltage. If the operator has said they are incorrect, a negative result of a test 197 will reach a step 198 in which a command is displayed to the operator to enter the battery type and the voltage as well as a format in which the battery type and voltage should be entered. Then, in response to such an entry, a step 199 will store the battery type and voltage for further use and a step 200 displays the stored battery type and voltage, as well as the question as to whether or not they are correct and the Y and N to incite a response from the operator. Then a test 201 determines if the process has been successful; if not, a negative result reverts to the step 198 requesting the battery type and voltage will be reentered beginning at step 198. Eventually, an affirmative result of the test 201 will reach a routine in FIG. 5 in which cabin heat and engagement with the station are handled, through a transfer point 202.

Figure 5:
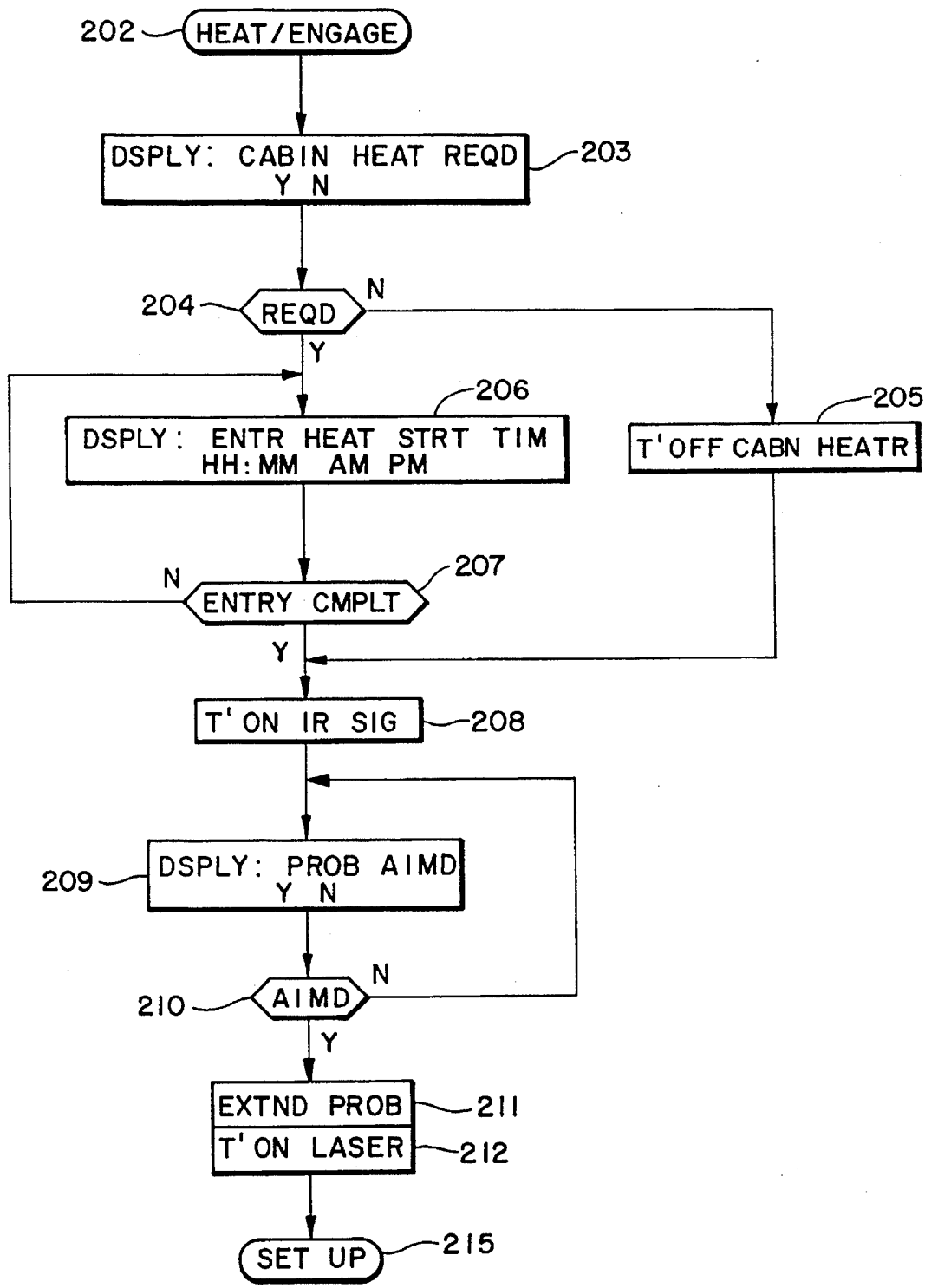

In FIG. 5, a first step 203 causes a display of a question to determine if cabin heat is required, or not, as well as the Y and the N for the operator's response. If the operator indicates that it is not required, a negative result of test 204 will reach a step 205 where it is assured that the cabin heaters are turned off. But, if it is required, an affirmative result of a test 204 reaches a step 206 which displays a request to the operator to enter the time when heat is supposed to be turned on, as well as a format of the hours, minutes and AM or PM in which it should be entered.

When the entry is complete, an affirmative result of a test 207 will reach a step 208 where the infrared arrival announcing signal is turned on, causing the transmitter 39 to broadcast infrared radiation towards the charge station. Then a step 209 displays a question concerning whether the probe has been aimed in the right direction or not. In this embodiment, the probe can be adjusted to point forward or to the left or to the right of the vehicle; it may be moved manually, or by means of the motor 150 (FIG. 1) with trivial software or switching, not shown. The step 209 invites the operator to determine that it is pointing in the correct direction. In this embodiment, it is generally assumed that the probe will be facing forward, to allow engagement of the type described hereinbefore. In any event, once the operator responds that the probe is aimed, an affirmative result of a test 210 will reach a step 211 which operates the probe extension cylinder control 82 (FIG. 1) to cause the probe to extend out in front of the vehicle so that it may engage the charge station, as described hereinbefore. Then a step 212 causes the laser diode 51 to turn on, thereby providing laser radiation to the detector 50 (FIG. 1) so as to permit the charge station to line up vertically with the vehicle. Once the control 82 is commanded to extend the probe, the cylinder 80 will thereafter receive air to drive the probe out, so it will become fully extended, as described with respect to FIG. 24. If a jack screw is used in place of a pneumatic cylinder, step 211 would turn the screw motor on; then a limit switch would be tested to turn the motor off when the jack screw becomes fully extended. And then, the program will advance through a transfer point 215.

If a charge station is at the side of the vehicle, the extension of the probe may be deferred until the vehicle is properly positioned. The test 210 would include such positioning by virtue of the display asking about vehicle positioning as well. Or, there can be a laser horizontal positioning system to help position the vehicle (in a manner analogous to the vertical positioning of the head).

Returning now to FIG. 2, in the normal case, the charge station computer 34 is cycling through a negative result of test 161, waiting for a vehicle to approach for a charge. When the infrared transmitter is turned on (step 208, FIG. 5) the vehicle present detector 35 provides the signal to the charge station computer 34 so that test 161 is affirmative, thereby passing through the step 162 and reaching the diagnostic subroutine 157. Assuming that everything is well, an affirmative result of test 158 will reach test 159. Since the initialization flag has just been reset, a negative result of test 159 will reach a series of steps 220 in which the display closed latch is reset (in case it had previously been set), and the external display 85 (FIG. 1) is caused to display something appropriate, such as that the station is now open. Then a test 221 will determine if the need to enter new power cost data has been manifested or not. In the event that the charge station computer 34 has an RS323 UART or a serial port (as does the MC68HC11), this need may be effected by means of a laptop computer, or other RS323 compatible device by the station owner or power company. If the need to input new power costs is manifested, an affirmative result of test 221 will reach a subroutine 222 which will accommodate the entry of the new power cost data. Then, vertical positioning of the head 45 is accommodated in the subroutine of FIG. 6 which is reached by a transfer point 223.

Figure 6:
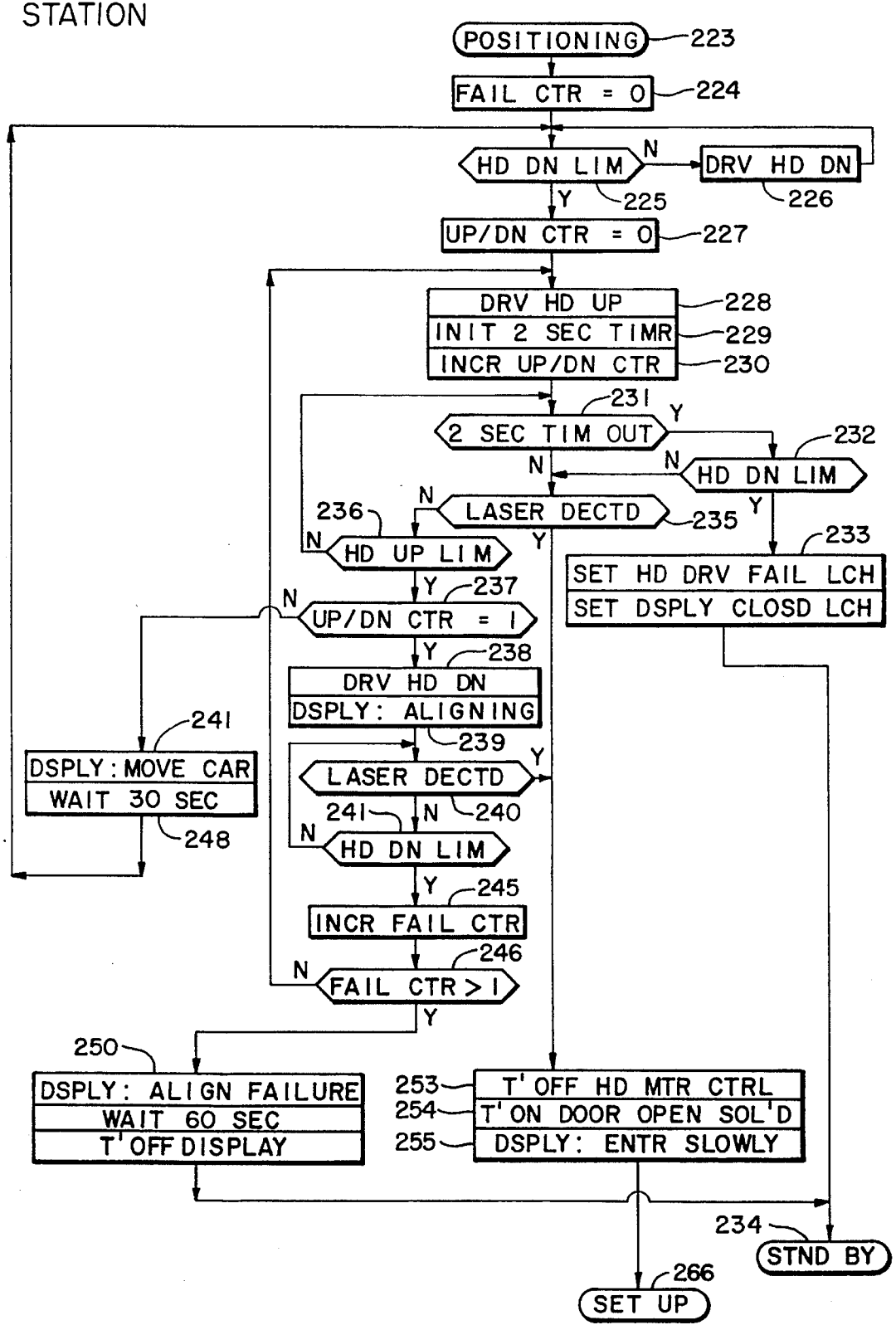
Figure 7:
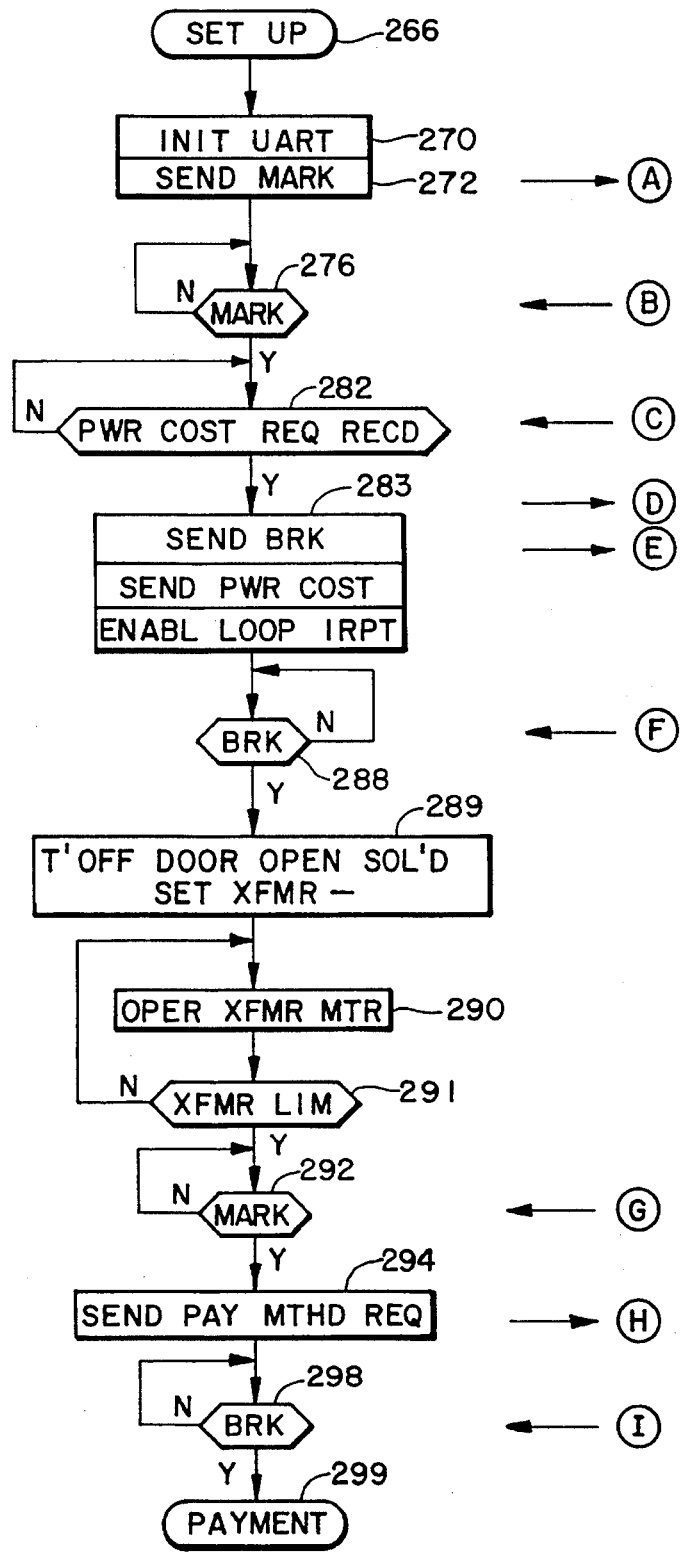

In FIG. 6, a first step 224 sets a fail counter to zero, for use as is about to be described. Then a test 225 determines if the head is lowered all the way onto its down limit switch. In the normal case, it will be, since that is the position at which it is parked in order to close the gate thereof against inadvertent damage, as is described hereinafter. But in the event that positioning against the down limit switch is not indicated, a negative result of test 225 will reach a step 226 which causes the head motor control 40 (FIG. 1) to cause the head 45 to be driven downwardly until it reaches the down limit switch. Then an affirmative result of the test 225 will reach a step 227 where an up down counter is set to zero, for purposes described hereinafter. Then, a step 228 causes the head to be driven upwardly and a step 229 causes a two second delay timer to be initiated. The delays in this embodiment may be generated in a variety of ways, such as presetting of any suitable up counter or down counter and clocking it at a known rate so that either a terminal count or reaching zero will issue a signal indicating that the delay has occurred, all as is well known in the art; other methods of causing delays may be utilized, to suit any implementation of the present invention. Then a step 230 increments the up down counter, thereby indicating that the head is on its first trip up. A test 231 determines if two seconds have elapsed. If so, a test 232 determines if the head down limit switch is still activated. If it is, that means there is something wrong with the head drive, and the station cannot be utilized. In such a case, an affirmative result of the test 232 will reach a pair of steps 233 to set an internal latch indicating that head drive failure has occurred, and to set a latch causing the external display 85 to display the fact that the station is closed, even after the computer is again returned to the standby condition through a transfer point 234 which reaches the step 160 (FIG. 2) to return the computer 34 to the stop mode. Both of these latches may be flip flops on an integrated circuit card external to the computer 34. Or, they may simply be computer software latches which drive the computer's discrete outputs. The "station closed" display is a static illuminated sign powered directly (not shown) from the AC main 32 under control of the latch.

In the normal course of events, driving the head up will cause the head to no longer close the down limit switch, so a negative result of either the test 231 or the test 232 in FIG. 6 will reach a test 235 which watches for the signal on the line 55 from the vehicle height detector 53. A negative result of test 235 reaches a test 236 to determine if the head has reached the upper limit switch or not; generally, it will not, so a negative result will return the program to the test 231. These tests therefore cause the alignment signal from the laser to be looked for until either it is sensed, the head down limit switch is still closed after two seconds, or until the head reaches the upper limit switch. Assuming that, for some reason, the laser is not detected in the upward motion of the head, an affirmative result of test 236 will reach a test 237 which determines if the up down counter is set to one. In the first pass through the test 237, it will be set to one since it was incremented to one in the step 230. Thus, an affirmative result of the test 237 will reach a step 238 which will the cause the head and motor control 40 to drive the head downward, followed by a step 239 which causes the external display 89 to display a suitable legend indicating that although there is some delay, the process is proceeding. The display might, for instance, allude to the fact that the aligning process is underway, and/or suggest that the operator be sure that the probe is properly aligned with the receptacle. As the head is being driven down, a test 240 looks to see if laser detection has occurred or not, and if not, a test 241 looks to see if the head has reached the down limit switch yet or not. Eventually, either the laser will be detected, or the head will reach the down limit switch again. An affirmative result of the test 241 will reach a step 245 where the fail counter (reset to zero in step 224) is incremented. This causes it to be set to one so that a test 246 will be negative causing the program to revert to the step 228 where once again the head will be driven upward to see if it can sense the laser from the vehicle. Once again, it initializes the two second counter at the step 229 and increments the up down counter at step 230, indicating that the head is on its second upward trip. If the laser is not detected by the time the head reaches the upper limit switch, an affirmative result of test 236 will this time reach a negative result of test 237 since the up down counter is now set to two. This will reach a step 247 which provides a suitable display to the operator to indicate that he should move the car so that another attempt to establish alignment may be made. Then a step 248 causes the process to wait a suitable length of time for the car to be moved, such as 30 seconds. After a suitable delay to move the car, the program will revert to the test 225 to try the alignment process all over again. This process will cause one up trip and one down trip of the head looking for detection of the laser beam. Failure at the end of the first round trip will cause an affirmative result of test 241 to cause the second trip, as described. But after the head reaches the down limit switch for the second time, an affirmative result of test 241 will reach the step 245 to increment the fail counter to two; then the test 246 will be affirmative reaching a series of steps 250 which will cause the external display 85 (FIG. 1) to display the fact that there is an alignment failure for about 60 seconds. And then, the charge station computer 34 reverts to the step 160 and is set into the standby mode (FIG. 2) through the transfer point 234. The alignment failure indication is turned off after a while so that other vehicles can use the station.

In the normal course of events, the head is driven up at step 228 (FIG. 6), it leaves the down limit switch so that a negative result of test 232 will cycle on the negative results of tests 235 and test 236 until the laser is detected. In the normal course, the laser is detected and an affirmative result of test 235 will reach a step 253 which turns off the head motor control 40 (FIG.1), thereby causing the head to stop at the vertical position where its alignment with the vehicle probe is assured by the laser beam. Then a step 254 causes the door solenoid driver 57 to operate the door solenoid 59 (FIG. 1), thereby opening the probe receptacle doors 60 so that the probe 52 may be inserted therein. A step 255 will cause a suitable message on the external display 85, such as a command to the operator to enter slowly. Note that if the vehicle is to connect to the charge station by means of a cable (instead of the probe herein) test/steps 208–212 (FIG. 5) and all of FIG. 6 can be eliminated. The use of emergency power (e.g. house current) may include an "emergency" switch that bypasses everything in the vehicle computer between FIG. 3 and FIG. 16. Also note that the positioning herein can be with an indicium other than a laser beam with respect to other than ground as a reference, in directions other than up and down; for instance, a feeler contact may control forward/rearward motion for probe alignment to the side of the vehicle. In any case, the charge station computer 34 then reaches a setup routine of FIG. 7 through a transfer point 266.

Figure 8:
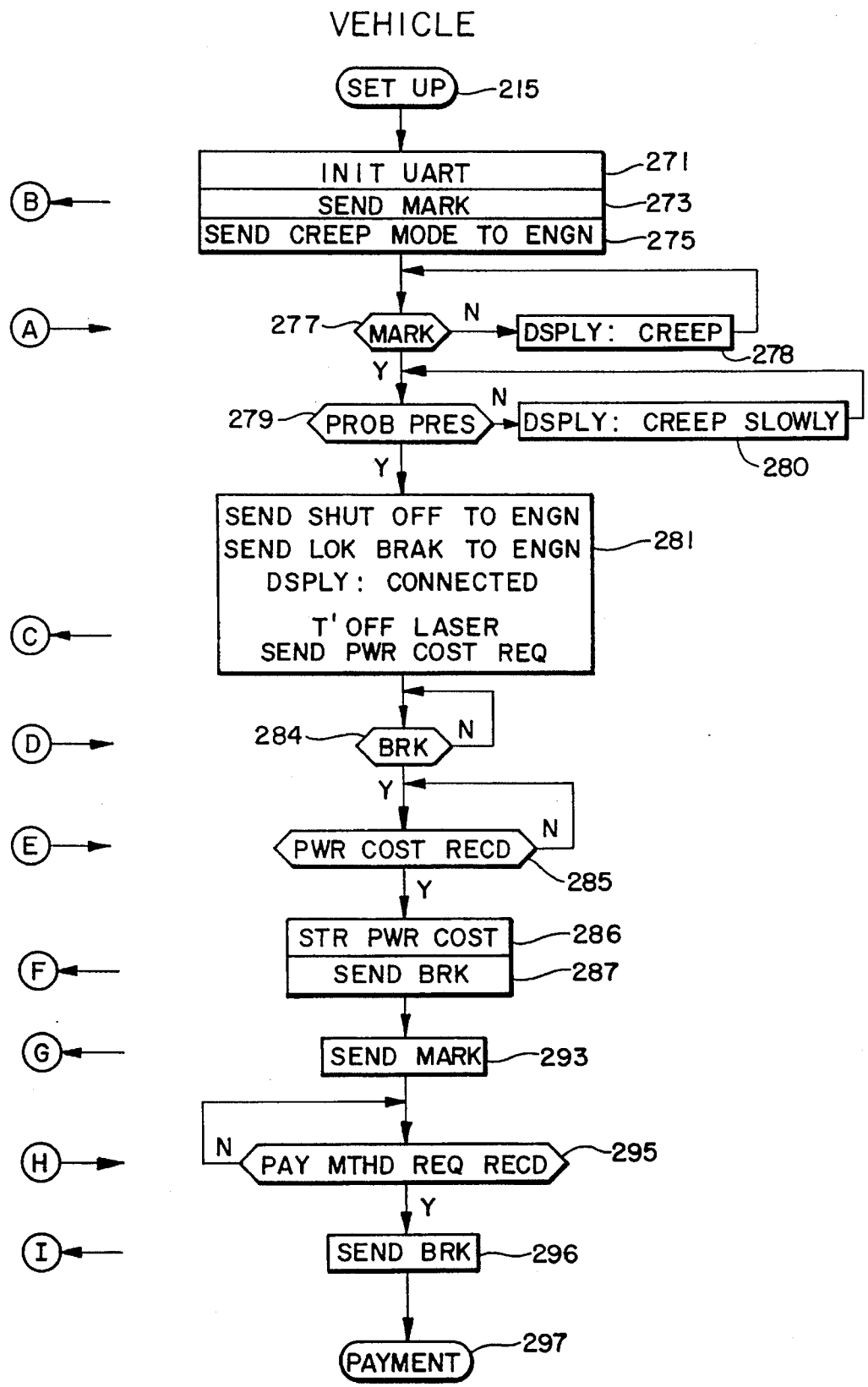

At about this same time, the vehicle charge computer 72 has entered the setup routine of FIG. 8 through the transfer point 215, as described hereinbefore. These two routines (FIG. 7 and FIG. 8) are described together in conjunction with keys (letters in a circle) with arrows indicating which computer is initiating a response, and which computer is responding to it. In steps 270 and 271, both computers initialize their UARTs and in a step 272 (FIG. 7) the station computer sends a mark, key A, from the current generator 89 toward the current receiver 96 (FIG. 1), and in a step 273 (FIG. 8) the vehicle computer closes the current switch 97 so as to be ready to pass the mark back toward the current receiver 102. At this time, it is unlikely that the operator has moved the vehicle into position; so there is not yet a connection between the probe 52 and the head 45. The vehicle computer then sends, in a step 275, a command to the engine and brake controller 74 to put the vehicle in a creep mode so that it can only go at an extremely small rate of speed, regardless of the command given to the engine by the operator. Then, both computers wait at corresponding tests 276 (FIG. 7) and 277 (FIG. 8) to sense steady current on the line, called "mark", which can occur only when a connection is made between the contacts 62–65. While the vehicle computer is waiting for current to be established in the loop 87, it cycles through a negative result of test 277, reaching a step 278 which causes the cockpit keyboard and display 75 to display a suitable legend, such as "creep", so that the driver will slowly enter the station. When connection is finally made between the contacts 62–65, current flows in the loop 87, 88, and an affirmative result of test 277 will reach a test 279 where the vehicle program cycles through a negative result, displaying a similar, though perhaps more cautious message to the operator in a step 280. Eventually, the probe will be inserted with sufficient force to cause the pressure sensor 104 to provide a signal on the line 103 (FIG. 1) thereby causing an affirmative result of the test 279 which reaches a plurality of steps 281 which send signals to shut off the engine and lock the brakes of the vehicle, to turn off the laser, to cause a suitable display to the operator, such as that the vehicle is now connected, and to send a request for power cost information, key C, to the station. The IR signal is left on to remind the station that the vehicle is present and connected, so the head drive 40, 42 will remain off. In the communications herein, "mark" is a steady current; "break" is a momentary interruption; all breaks and messages (many breaks) return to marks; so breaks and messages can always be sent.

In the meantime, the station has been waiting at a test 282 (FIG. 7) for the power cost information request, during which time it continues to send current into the loop. This request is made by serially encoding (through the switch 97) a message in the current loop 87, 88. When this message is sensed, an affirmative result of test 282 will reach a set of steps 283 which acknowledge the receipt by causing a momentary break (no current) in the current loop 87, 88, key D, send the power cost information to the vehicle, key E, and enables the loop interrupt in the computer 34, so the retriggerable monostable multivibrator 154 (or equivalent COP or software) can begin monitoring the integrity of the current loop 87, 88. The power cost information may simply be dollars per watt, or may be a look-up table of cost per time of day, as desired. This may be used to generate a favorable start time for charging. The break, key D, is sensed by a test 284 in FIG. 8, which reaches a test 285 to see if power cost has been received by the vehicle. An affirmative result of test 285 reaches a step 286 which stores the new power cost information and a step 287 which confirms receipt of the message by causing a momentary break, key F, through the current loop 87, 88. This causes a test 288 (FIG. 7) to be affirmative reaching a pair of steps 289, one of which turns off the door solenoid driver 57 (FIG. 1), so the doors will close partly, to the point where they are resting on the probe, thereby providing some protection from the elements. The other of the steps 289 sets the auto transformer motor drive circuit 134 (FIG. 1) to drive in the lower voltage direction, and a step 290 operates the drive motor to be sure it is at its low voltage setting, thereby to ensure that it will not damage whatever battery the incoming vehicle may have. A test 291 determines when the transformer has reached the lower limit. So long as test 291 is negative, the motor will be pulsed in the down direction. In one embodiment, the transformer is driven by a 2000 rpm, 5 V motor, by means of 12 volt pulses which last about ⅓ of a revolution. However, stepper motors or other skewing systems can be used. When the low voltage limit is reached, the station computer waits at a test 292 for a mark (a steady current) to be passed through to it, key G, which is accomplished in FIG. 8 by a step 293. Establishing the mark transfers control of the loop back to the station. Then, a step 294 (FIG. 7) requests that payment method information be provided to the station, key H, and when that occurs, an affirmative result of a test 295 (FIG. 8) reaches a step 296 which causes a break, key I, in the current back to the station to acknowledge receipt of the payment method request. Then, the vehicle charge computer 72 advances to a vehicle payment subroutine in FIG. 10 through a transfer point 297; in the meantime, receipt of the break confirmation, key I, (FIG. 7) causes an affirmative result of a step 298 to reach a payment routine for the charge station computer 34 in FIG. 9 through a transfer point 299.

Figure 9:
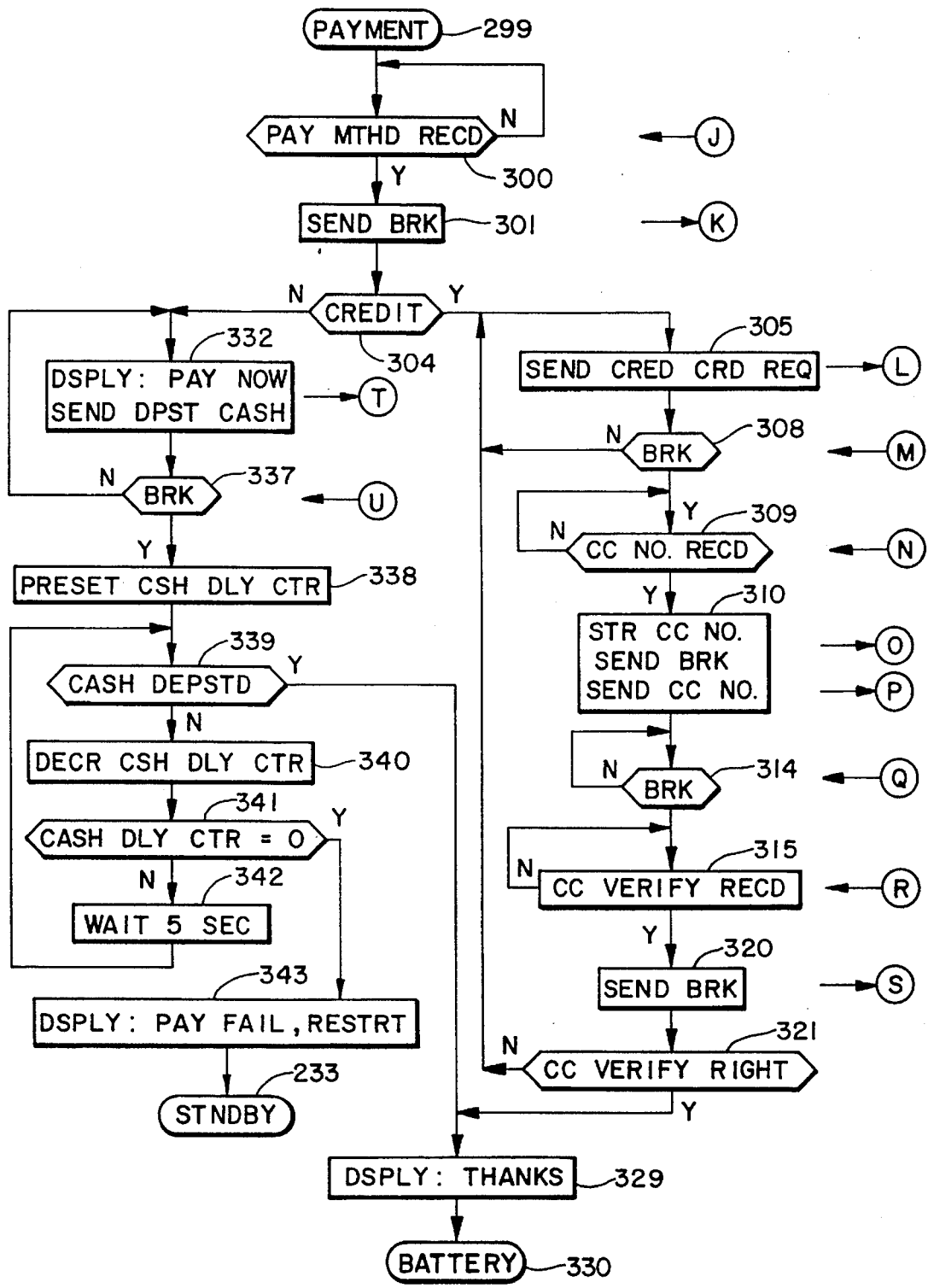
Figure 10:
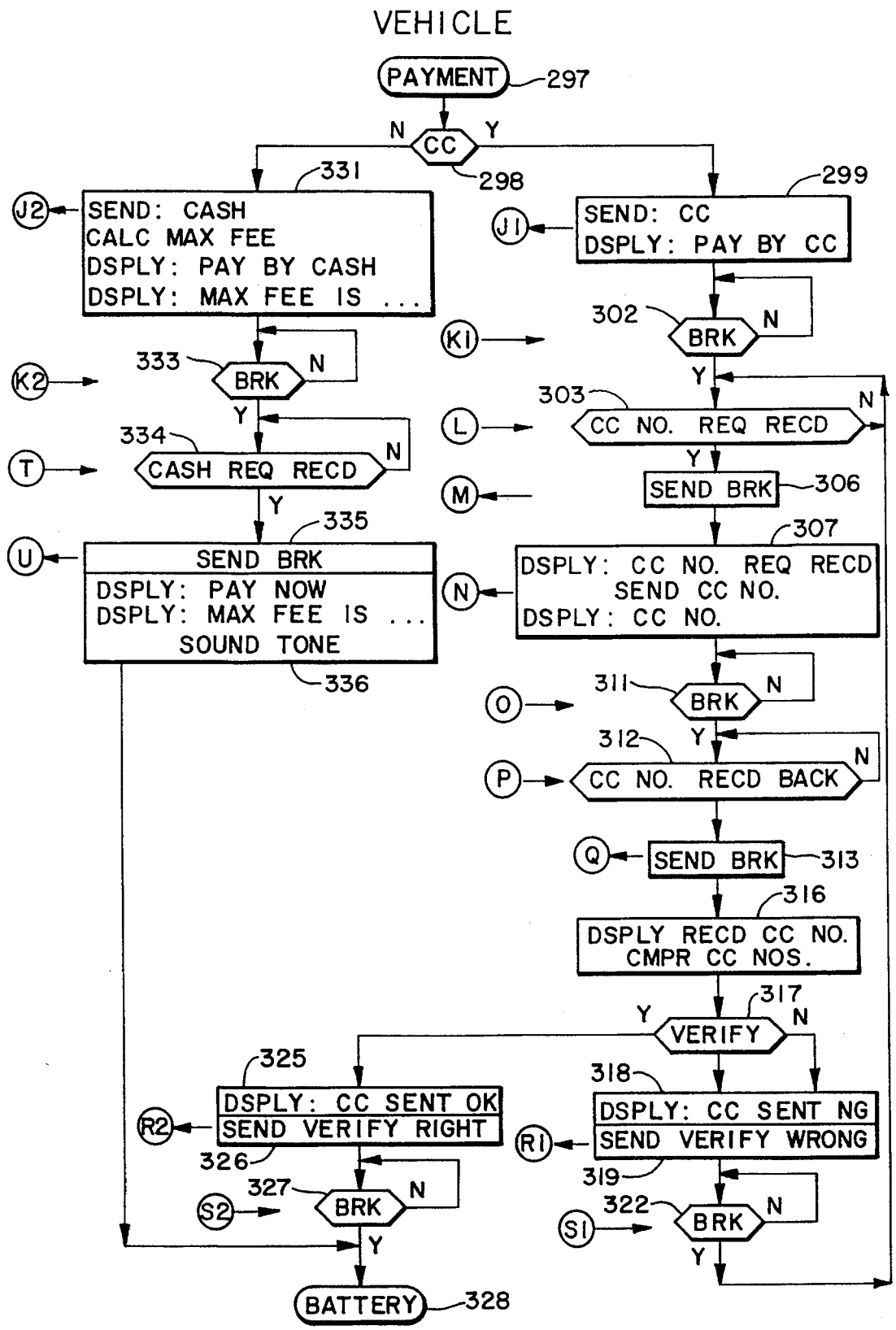

In FIG. 10, a first test 298 determines whether payment is to be by credit card, or not. If so, an affirmative result reaches a pair of steps 299 in which the fact that payment is to be by credit card is sent to the charge station computer, key J1, and the display tells the operator that payment is to be by credit card. In FIG. 9, a test 300 determines when the payment method information is received, key J, and then a step 301 acknowledges receipt by sending a break, key K. In FIG. 10, the acknowledgement is sensed at a step 302, key K1, which reaches a test 303 where the vehicle charge computer waits for a request for the credit card information. In FIG. 9, a test 304 responds to the payment method (received at test 300 and stored, of course) and an affirmative result (in this example) will reach a step 305 in which the charge station computer requests the credit card information, key L; this causes the routine of FIG. 10 to advance from a test 303 to a step 306 where it sends a break, key M, to acknowledge receipt of the request for credit card information. Then, in a series of steps 307, the vehicle charge computer displays to the operator that the credit card information has been requested, it sends the card number previously determined and stored at steps and tests 188–194 of FIG. 4 to the charge station computer, key N, and displays that credit card number to the operator. In FIG. 9, after sending a request for the credit card in step 305, the station routine waits at a test 308 for acknowledgment of its request, and when that is received, key M, it advances to a test 309 where it waits to receive the actual credit card number, key N. Once the number has been received, a series of steps 310 store the credit card number, acknowledge the receipt of it by sending a break, key 0, and then return the same credit card number back to the vehicle charge computer, key P, to verify the same. In FIG. 10, the acknowledgement, key 0, is recognized at a test 311 and the vehicle program advances to a test 312 where it awaits receipt of the returned credit card number, key P, for verification purposes. Then a step 313 acknowledges receipt of the credit card for verification purposes, key Q, which causes the station program of FIG. 9 to advance from a test 314 to a test 315 where it awaits determination of verification of the card number. In FIG. 10, a pair of steps 316 displays the credit card number which has been received back from the station, and compares the credit card numbers (the one just received from the station with the one which was stored in FIG. 4). Then, a test 317 determines if they verify or not. If not, a step 318 informs the operator that there has been an error in transmission, and a step 319 sends a message to the station computer, key R1, that the verification credit card number was wrong. In FIG. 9, receipt of the verification message causes test 315 to advance to a step 320 which sends a break, key S, to acknowledge receipt thereof and then tests the meaning in a test 321. In this first example, the verification is wrong, so a negative result of test 321 will return the station program to step 305 to begin the process all over again. In FIG. 10, receipt of the acknowledgement break, key S1, causes a test 322 to revert the vehicle program back to test 303 so as to repeat the entire process a second time. This process could repeat itself with a wrong verification a few times after which a watchdog timer or the equivalent may signal a problem and the display may indicate that the problem relates to the credit card, one way or the other.

In the usual case, there will be no problem verifying the credit card number so an affirmative result of test 317 (FIG. 10) will reach a step 325 where the display informs the operator that the confirming credit card number is OK, and a step 326 sends a message to the station computer that the credit card has been verified correctly, key R2. Then, a step 327 awaits acknowledgement of the credit card number verification message. When the verification is received, key $2, the vehicle charge computer program will advance to a battery routine of FIG. 12 through a transfer point 328. In FIG. 9, when the credit card verification is determined to be right, an affirmative result of test 321 will reach a step 329 where the external display 85 (FIG. 1) is caused to say "Thanks", or the equivalent, to the operator. And then the charge station computer program advances to its own battery routine of FIG. 11 through a transfer point 330. Note that all credit card transactions between the creditor and the charge station can be handled in the same way as in gasoline credit/debit pumps, and the term "credit" is synonymous with "debit" herein. Note also, that for home use, the routines test a "home" flag after test 292 (FIG. 7) and step 293 (FIG. 8) to branch directly to FIGS. 11 and 12, respectively, bypassing the payment exchange.

In FIG. 10, returning once again to the first test 298, if a cash payment method had been indicated in FIG. 4, then a negative result of test 298 will reach a set of steps 331 where a message is sent to the station computer indicating that payment is to be by cash, key J2, calculate a maximum fee that the operator should insert in order to avoid overpaying. This is to prevent paying for more power than the vehicle can use: the machine won't give a refund. This is the amount it would cost to bring the battery to nearly full charge at the lowest rate in round dollars. The vehicle display informs the operator that payment is to be by cash and what the maximum fee is. In FIG. 9, the test 300 receives the information that payment is to be by cash and the step 301 acknowledges receipt, key K. This time, the test 304 determines that payment is not to be by credit, so a negative result reaches steps 332 which advises the operator to pay now (if desired) and send a message back to the vehicle computer to deposit the cash, key T. In FIG. 10, the vehicle computer receives the break, key K2, to acknowledge receipt of its payment method message, and then waits at test 334 for the demand to deposit the cash, key T. When it receives it, a step 335 sends an acknowledgement break, key U, and a set of steps 336 will cause the display to command the operator to pay now and what the maximum fee is, and will sound a tone or synthesized voice message to get the operator's attention. Then, the vehicle charge computer program will advance to the battery routine of FIG. 12 through the transfer point 328. In FIG. 9, acknowledgement of its deposit cash demand of step 332 is received at test 337, key U, and a step 338 presets a cash delay counter which may count some reasonably large period of time such as a couple of minutes, during which time the operator will leave the vehicle (if necessary) or reach through the window (if possible) to insert one or more bills into the counting cash receiver 105 (FIG. 1) so as to establish a credit to pay for charging the battery. During this period of time, a first test 339 determines if the cash has been deposited yet as indicated by a payment complete button being pressed. In the first pass, that is rather unlikely so a negative result of test 339 will reach a step 340 where the cash counter is decremented, and a test 341 determines if the cash counter has reached zero yet, or not. In each early pass, it will not, so a negative result of test 341 will reach a step 342 where the program waits about five seconds, and then reverts to the test 339 to see if the cash is deposited yet or not. If the cash never gets counted, then eventually the step 341 will be affirmative indicating that there has been a long enough wait to see if the cash is going to get deposited, and a step 343 will cause the external display 85 (FIG. 1) to inform the operator, in some fashion, that his paying for his power has failed and he should restart the process. And then, the charge station computer 34 reverts to its standby condition (FIG. 2) through the transfer point 233. In the usual case, however, the cash will get deposited and an affirmative result of the test 339 will reach the step 329 where the external display 85 is caused to display "Thanks" (or equivalent) to the operator, and then the charge station computer battery routine of FIG. 11 is reached through the transfer point 330.

Figure 11:
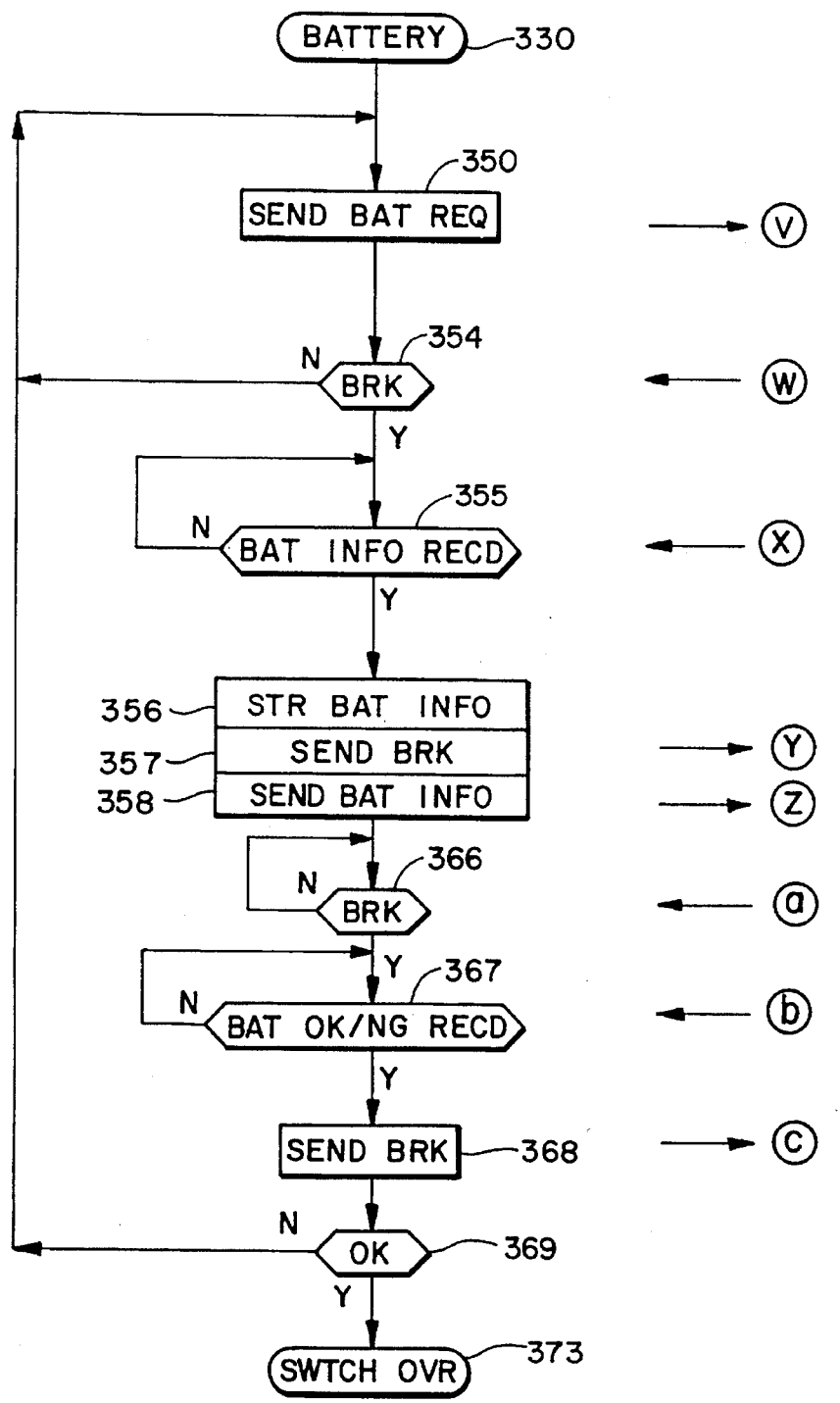
Figure 12:
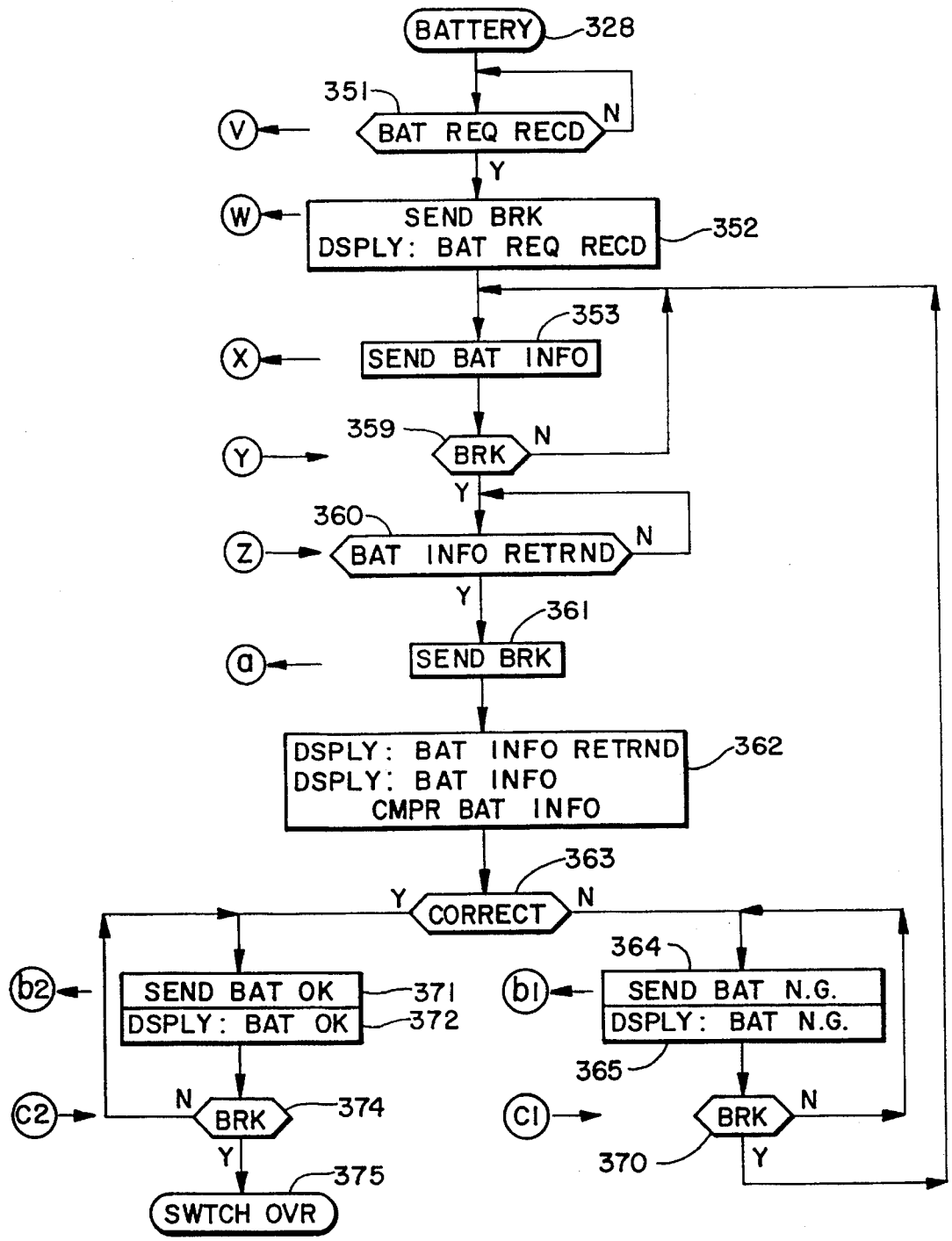

In FIG. 11, a first step 350 sends a request to the vehicle computer for battery information, key V, which is received at test 351 in FIG. 12. This causes a pair of steps 352 to acknowledge the receipt of the request by sending a momentary break, key W, and to inform the operator that battery information has been requested. Then a step 353 sends the battery information to the station computer, key X. In FIG. 11, the acknowledgement break is received at a test 354 so the station program advances to a test 355 to await the battery information, key X. When it arrives, an affirmative result causes a step 356 to store the battery information and a step 357 acknowledges receipt thereof by sending a momentary break to the vehicle computer, key Y. Then, a step 358 resends the battery information back to the vehicle computer, key Z. In FIG. 12, acknowledgement of the battery information, key Y, is recognized at a test 359 and then the program has waited at a test 360 for receipt back of the confirming battery information, key Z. When it is received, a step 361 sends a confirming break, key a, and a plurality of steps 362 cause the vehicle display to inform the operator that battery information has been returned, display the battery information for the operator to view, and compare the information to see if it is correct; and a test 363 will respond accordingly. Assuming that the information is incorrect at first, a negative result of test 363 will reach a step 364 which sends a message to the station computer that the battery information is no good, key b1, and causes the display to tell the operator that the battery information is wrong at a step 365. In FIG. 11, the acknowledgement of the returned battery information, key a, is sensed at a test 366 and causes the station program to wait at a test 367 for information as to whether the confirming battery information was correct or not. Once it is received, key b, a step 368 provides a momentary break, key c, and a test 369 determines whether the response received at test 367 was OK or not. In this example, a negative result of test 369 will cause the station program to revert to test 355 to begin the battery information exchange all over again; in FIG. 12, upon receiving the confirming break, key c1, a test 370 will cause the vehicle program to revert to step 353 to begin the battery information exchange process again. If this loop repeats many times, a general computer COP will signal a fault.

Usually, (or eventually), correct battery information will be provided and an affirmative result of test 363 (FIG. 12) will reach a step 371 where a message is sent to the station computer that the battery information is OK, key b2, and the operator is informed by the display that the battery information is OK at a step 372. In FIG. 11, the message that the result of the battery information comparison has been received, key b, will cause an affirmative result of test 367 to reach step 368 to send a confirming break to the vehicle computer, key c, and an affirmative result of the test 369 will cause the charge station computer program to advance to a switchover routine of FIG. 13 through a transfer point 373. Sending the confirming break at step 368 will cause the vehicle charge computer (FIG. 12) to respond, key c2, at a test 374 and cause the vehicle charge computer to advance to its switchover routine of FIG. 14 through a transfer point 375.

Figure 13:
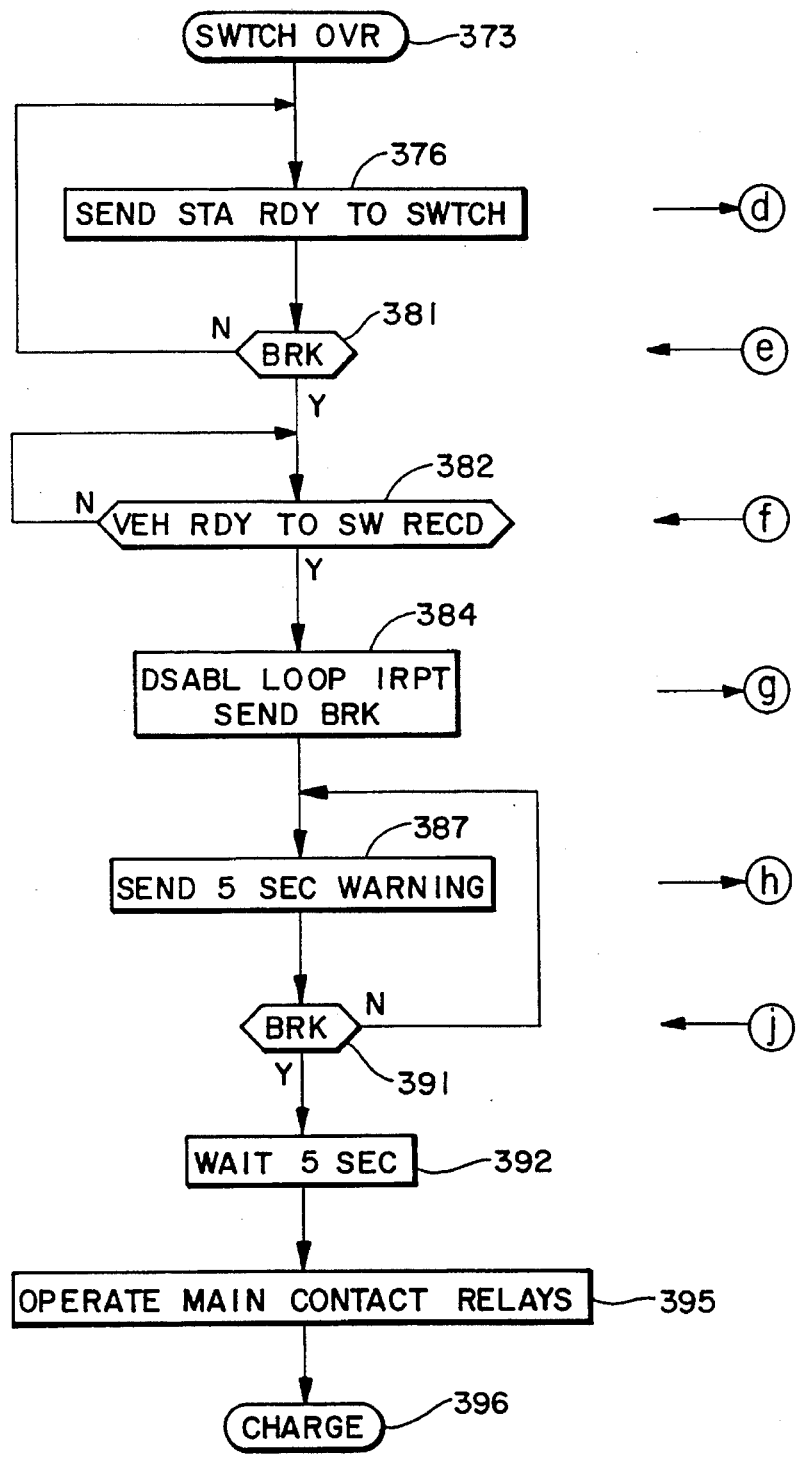
Figure 14:
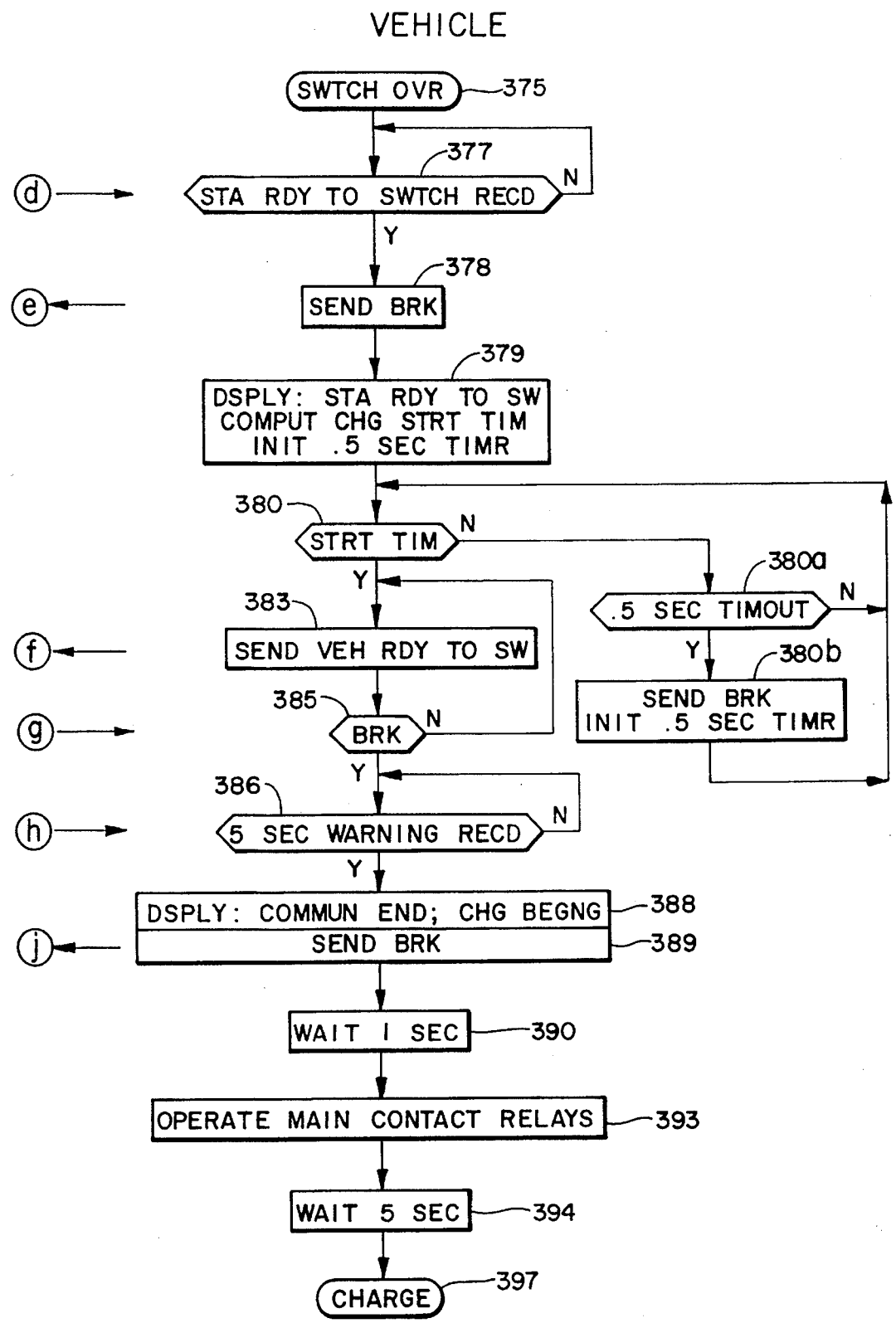

In FIG. 13, the charge station computer first reaches a step 376 which sends a message to the vehicle charge computer that the station is ready to switch over, key d, which is received in FIG. 14 at a test 377. The vehicle computer confirms this receipt by causing a momentary break, key e, in a step 378, and then a set of steps 379 cause the display to inform the operator that the station is ready to switch over, and computes a charge start time based on the time which the operator has told the computer that it has to receive the charge (step 181, FIG. 4), the cost of power information (which includes time of day cost preferences) transmitted to the vehicle and stored at step 286, FIG. 8, and the battery condition indicated by the battery status indicator 146 (FIG. 1). The steps 379 also initiate a half second timer that will be used to cause breaks in the loop current every half second while (if) the vehicle waits before starting the charge. A break in the loop keeps the monostable 154, FIG. 1 (or equivalent software), from timing out. This keeps the integrity check going during the otherwise quiescent waiting period. Then, the vehicle charge computer program waits at a test 380 until it is time to start the charge.

Meanwhile, the acknowledgement of the ready to switch message made at step 378 is received in FIG. 13 at test 381, key e, which causes the charge station computer program to wait at a test 382 until the vehicle tells the station that the vehicle is ready to switch. This could be some time, or instantaneous, depending on the entry of time available, step 181 (FIG. 4). During the wait time, a negative result of test 380 reaches a test 380a to see if the half second timer has timed out. If so, steps 380b will cause a break in loop current (to retrigger the monostable 154 or equivalent software) and then reinitiate the half second timer. Most of the time, test 380a will be negative, looping back through test 380 until the computed start time arrives.

When finally it becomes time for the charging of the battery to begin, an affirmative result of test 380 (FIG. 14) reaches a step 383 where the vehicle sends a ready to switch message, key f, to the station causing its program to advance in FIG. 13 to steps 384 which will disable the loop interrupt (since communicating and waiting have ended) and acknowledge the ready to switch message, key g, which in turn causes a test 385 (FIG. 14) to advance to a test 386, to wait for a five second warning. The charge station computer (FIG. 13) then reaches a step 387 which sends a five second warning to the vehicle charge computer, key h, which causes the vehicle program (FIG. 14) to advance from test 386 to a pair of steps 388 where the display informs the operator that the communication phase is ending and the charge phase is going to begin, and then sends a confirming break, key j, in a step 389, and then goes into a one second wait at a step 390. In the meantime, the charge station computer receives the confirming break, key j, at a test 391 and begins a five second waiting period at a step 392. Back in the vehicle computer, as soon as the one second waiting period of step 390 is over, a step 393 causes operation of the main contact relays 92, 94 so as to cause transfer of the armatures of the main relay 94 from their normally closed contacts 93, 99, used in the communication current loops 87, 88 to their normally open contacts 116–117 which are used for transferring charge current from the station to the vehicle. Then, a five second vehicle waiting period begins at a step 394. In FIG. 13, the five second waiting period of step 392 will end approximately one second before the five second waiting period 394 (FIG. 14) in the vehicle (due to the step 390); when the five second waiting period of step 392 ends, a step 395 will cause the station's main contact relay 92 to transfer its armatures from its normally closed contacts 91, 100 to its normally open contacts 114, 115 so as to handle the charge current. As soon as the station's main contact relays have been transferred at step 395, the charge station computer program will advance to its charge routine of FIG. 15 through a transfer point 396. About one second later, the vehicle's five second waiting period (394, FIG. 14) will end so that the vehicle charge computer program will advance to its charge routine of FIG. 16 through a transfer point 397. These two routines operate completely independently and asynchronously of each other. Note that the vehicle/station communications and exchanges of the invention may be implemented through media other than the hard-wire connections used herein, including IR, laser, RF, optics, inductive, sonic and so forth. Furthermore, the communications may be had via a media different from the charging power transfer (current) medium (herein, both media are the probe-receptacle connection). And, the connection medium for both communications and charging power transfer may be the same yet other than hard wire—such as inductive. Also, the selection means for connecting the computers together and connecting the power source to the battery charging apparatus may be other than the relays 92, 94.

Figure 15:
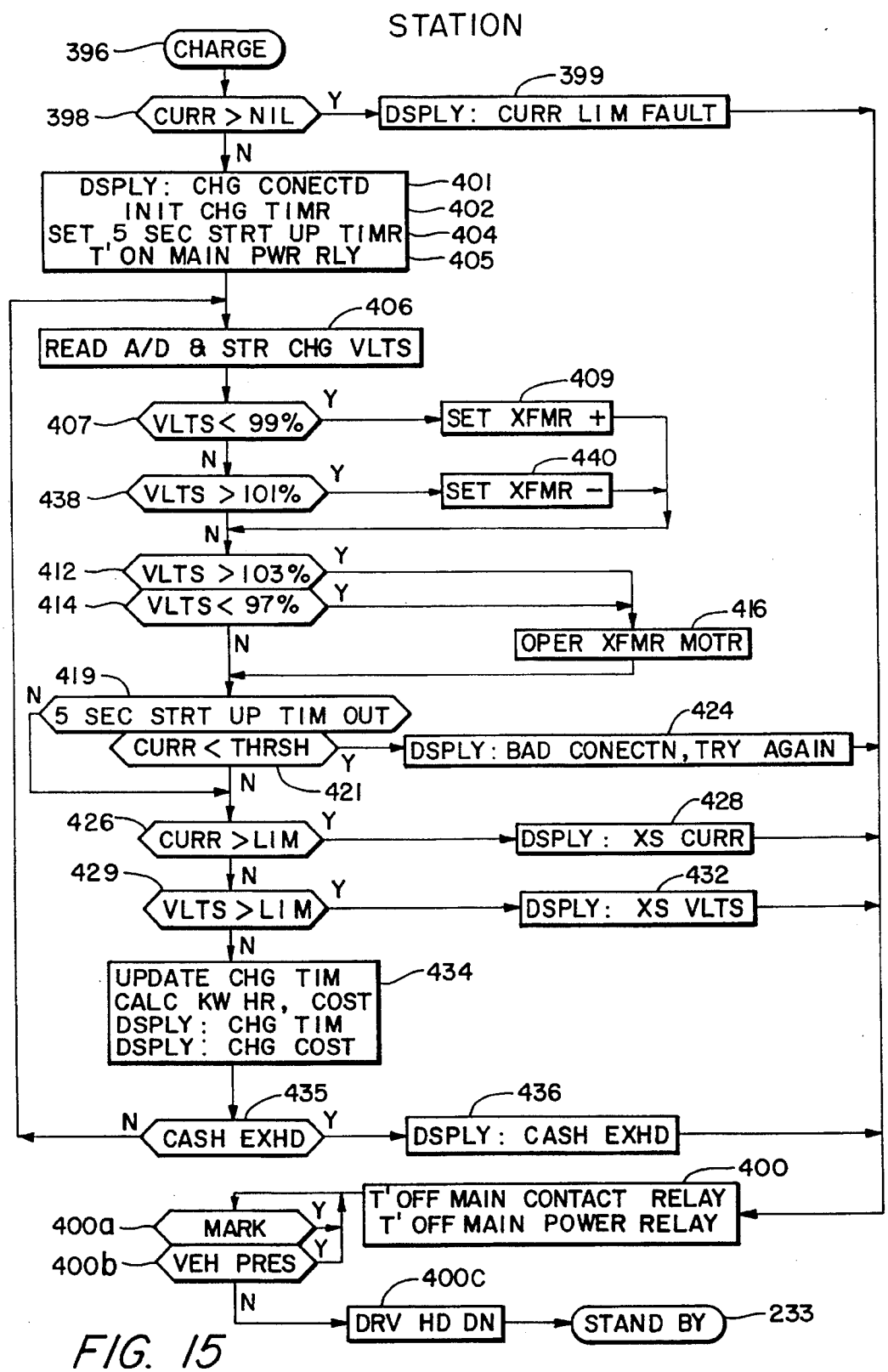

In FIG. 15, a first test 398 determines if the current indicated by the line current measuring circuit 129 (FIG. 1)

is more than some negligible threshold value (nil). If it is, this indicates something is wrong because at this point in time, the main power relay 128 (FIG. 1) has not been operated so there should be no power being transferred at all. If there is more than a negligible current in the main lines, an affirmative result of the test 398 will reach a step 399 where the external display 85 (FIG. 1) informs the operator that there is a current limit fault; and then a series of steps 400 will turn off (FIG. 1) the main contact relay 92 and the main power relay 128 (redundantly, at this point). Then a test 400*a* determines if the probe 52 is still connected with the head 45. If so, the current in the loop will cause hanging up at test 400*a*, because the current transmitter 89 is still on. If not, a negative result of test 400*a* reaches a test 400*b* to see if the vehicle is still present (35, FIG. 1). If so, an affirmative result of test 400*b* causes the routine to hang up. Eventually, the vehicle will move on, and a negative result of test 400*b* will reach a step 400*c* that causes the probe receptacle head 45 to be driven down, so as to close its protective gate (described hereinafter). And then, the charge station computer 34 will revert to its stop condition through the standby transfer point 233.

Assuming, as will be the usual case, that there is no problem with the main current carrying lines, a negative result of the test 398 will reach a step 401 where the external display 85 (FIG. 1) is caused to inform the operator that the charging circuits are connected, or the like. Then, a step 402 initiates a charge timer, which is utilized to track the duration of the charge for use in calculating the cost of electricity used, a step 404 sets a 5 second start up timer for use described hereinafter, and a step 405 turns on the main power relay 128 (FIG. 1). This causes power to be applied to the auto transformer 127, which now has a zero output, however. Then, a step 406 reads the A to D converter input 138 to the charge station computer which is connected to the charge volts rectifier 137. Then, a test 407 determines if the voltage is 99% of the set (or target) voltage which was established by communicating with the vehicle as described with respect to FIGS. 11 and 12 hereinbefore. In this embodiment, it is assumed that initialization of the charge station computer always causes the motor drive circuit 134 to return the auto transformer 127 (FIG. 1) to the zero volts condition, as described with respect to FIG. 7. Therefore, an initial result of the test 407 will always be affirmative so that a step 409 will set the motor drive circuit 134 to drive the transformer in a positive (increasing voltage) direction. And then, a test 412 determines if the voltage is greater than 103% of the set voltage for the battery in the vehicle. In these initial stages, it will not be, so a negative result of the test 412 reaches a test 414 which determines if the voltage is less than 97% of the set voltage; in this initial stage it always will be, so an affirmative result of the test 414 will reach a step 416 which will operate the transformer motor drive circuit 134 causing the voltage output of the auto transformer 127 to increase. Then, a test 419 checks to see if the 5 second start up timer has timed out. This allows the vehicle to begin charging, after the one second additional delay from the switchover of the main relays, before testing for a threshold amount of current in a test 421. In the first few passes, a negative result of test 419 bypasses test 421. But in each pass subsequent to the five second time out, the test 421 determines if the current is less than some very small threshold amount. If there is so low a current as to indicate a bad connection, an affirmative result of test 421 will reach a step 424 in which the external display 85 provides an indication to the operator that there is a bad connection between the vehicle and the station and that the operator should try the process all over again; and then the steps 233, 400 etc. are reached as described hereinbefore to shut the station down and revert to the standby condition.

Assuming that test 421 is bypassed or there is sufficient minimum current, a negative result of the tests 419, 421 will reach a test 426 which determines if the current provided by the line current measuring circuit 129 (FIG. 1) exceeds a current limit which is established by manufacturer's data for a battery of the type which was indicated in FIG. 11. If there is excessive current, an affirmative result of the test 426 will reach a step 428 which causes the external display 85 (FIG. 1) to provide an indication to the operator that there is excess current, and the program is reverted to standby through the steps 233, 400, as described hereinbefore. If the current is not excessive, then a step 429 determines if the voltage is beyond limits of safe voltage for a battery of the type indicated in FIG. 11. If so, a step 432 causes the external display 85 (FIG. 1) to provide an indication to the operator that an excessive voltage situation exists, and the charge station reverts to the standby mode through the steps 233, 400, as described.

If voltage is not outside of limits, then a negative result of the test 429 will reach a series of steps 434 in which the amount of elapsed charging time is updated, the kilowatt hours and cost of the charge are calculated, and the charge time and cost, so far, are provided to the operator through the external display 85 (FIG. 1). The calculation of kilowatt hours employs straightforward sampling of volts and amps on a cyclic basis, and utilizing a constant related to cycle time to multiply into volt-amp-hours. The cost is simple multiplication of rate; either absolute or selected by real time from a table. Then, a test 435 determines if the amount of cash which has been deposited is exhausted. If so, a step 436 causes that fact to be displayed. If not, a negative result of test 435 causes the program to revert to step 406 once again. Again, the charge volts A to D converter is read off the line 138 (FIG. 1) and the test 407 determines if the voltage has yet reached 99% of the rated voltage. Eventually, the auto transformer will have been advanced to the point where the voltage output will be essentially 99% of what it seeks to be, so a negative result of test 407 will reach a test 438 which will determine whether the voltage exceeds 101% of the set voltage. If so, a step 440 sets the motor drive circuit 127 to decrease the output voltage. Initially, it is assumed that it will not, so a negative result of test 438 will reach the tests 412 and 414; this will leave the transformer set either plus or minus depending on which of the tests 407, 438 was last affirmative. But if the voltage is between 99% and 101% of the set voltage, then both of the tests 412, 414 will naturally be negative so that the step 416 will not be reached and the auto transformer will be left where it is set. This routine between the steps and tests 407–416, 438 and 440 is an extremely simple, low-cost method of achieving hysteresis to keep the auto transformer drive motor from continuously hunting. The autotransformer motor is a 5 volt DC bidirectional motor and it is driven by 12 V for 15% of a 200 ms cycle (the loops through FIG. 15), and in a sense emulates a stepper motor. The use of this relatively simple hysteresis arrangement is permissible because the proper voltage can be applied to the battery 71 (FIG. 1) by the rectifier and battery charge control 121 (FIG. 1) so long as the voltage applied to it is plus or minus one or two percent of the set voltage. This then, is a simple, cost effective way to implement a servo system which may be used to control, in general, temperature, positions and other parameters beside voltage.

The voltage which is to be achieved depends on the battery system in the vehicle. For instance, if there are four 12 volt lead-acid batteries in series, having a nominal terminal voltage of 48 volts, the battery bank would need to be charged at approximately the summation of 14 volts per cell, which equals 56 volts of DC. This would require AC voltage of approximately 62 volts RMS with a peak at about 88 volts. All of this detail is known to those skilled in the art. Similar analysis will apply for other types of batteries, if used. Note that the transformer and its drive system are in the station to save vehicle weight, even though the rectifiers and battery charge control are on the vehicle to permit emergency charging with house current. The system therefore does not employ a "charger component".

Figure 16:
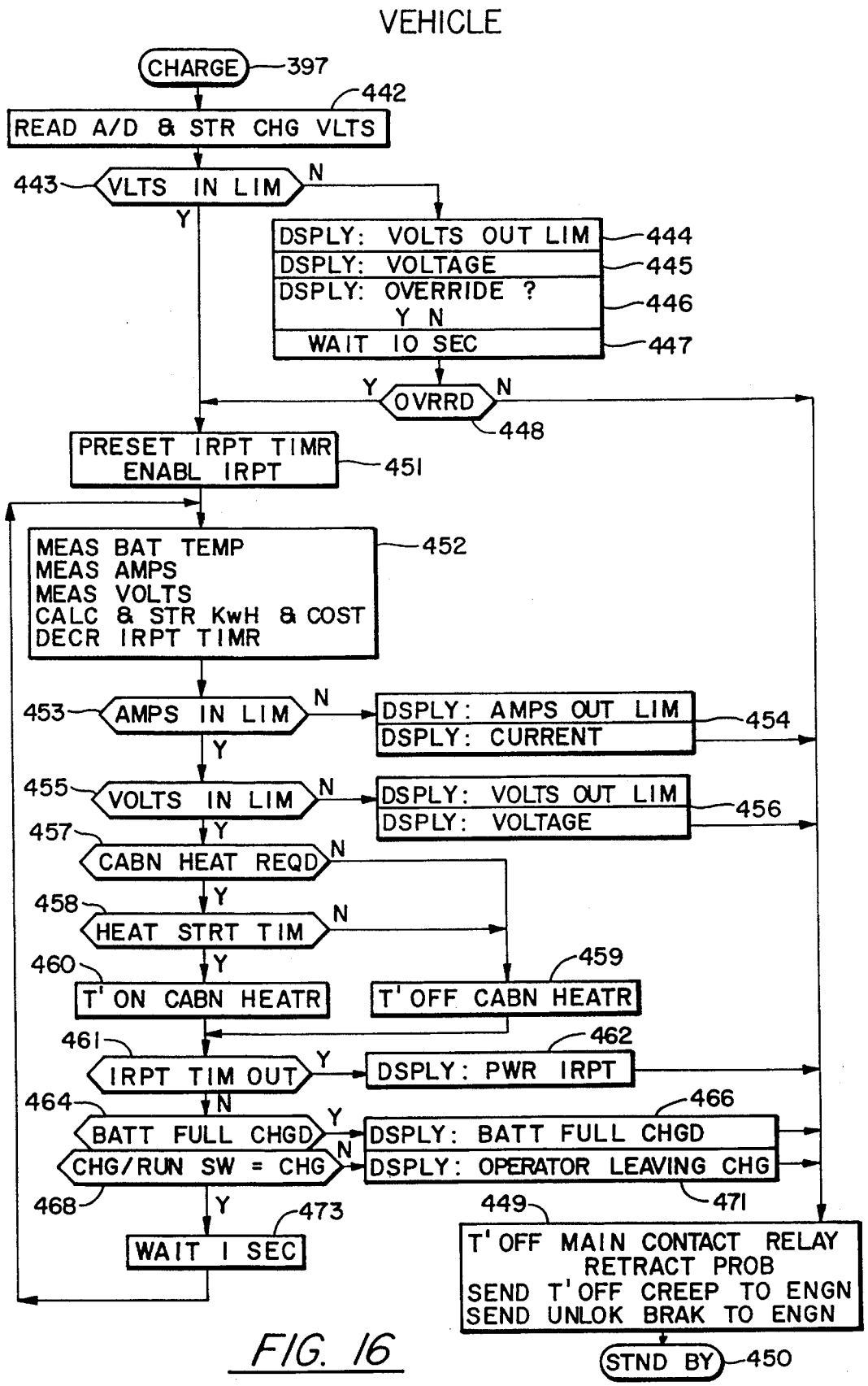

The station enters the routine of FIG. 15 approximately one second before the vehicle charge computer enters its charge routine of FIG. 16. During that time, the routine of FIG. 15 rapidly passes through affirmative results of tests 407 and 412 many, many times to cause a steady upward slewing of the voltage output from the auto transformer 127, so that the voltage will be at or near set voltage when the vehicle enters its charge routine of FIG. 16. Therein, a first step 442 measures and stores the incoming charge voltage which is provided to an A/D input of the computer 72 from the rectifier and battery charge control circuits 121. Then, a test 443 determines if the voltage is within limits. If not, a negative result will reach a step 444 which causes the cockpit keyboard and display 75 to indicate to the operator that the voltage is out of limits, a step 445 which causes a display of what the voltage is, and a step 446 which causes a display of a request to the operator of whether he wishes to override the over voltage situation, with yes or no prompts. Then, a step 447 waits for ten seconds before reaching a test 448 to see if the operator has indicated an override or not. If not, a negative result of the test 448 will reach a series of steps 449 where the vehicle main contact relay 94 is disenergized to attempt to reestablish the current loop 87, 88, so the station can check to see that the probe has disembarked before lowering the probe receptacle head 45; the loop switch 97 is still closed, after having caused a momentary break at step 389, FIG. 14. Then, the probe is commanded to be retracted, and instructions are sent to the engine and brake controller 74 to turn off creep and to unlock the brakes, so that the car can be removed from the charging station; then the vehicle charge computer 72 reverts to the stop mode of FIG. 3 through a standby transfer point 450.

One purpose for the override is to permit connecting the vehicle (with a suitable adaptor or tap) to ordinary 110 V AC house current (or 220 V, if appropriate) for emergency charging. This is possible because the rectifiers are located in the vehicle, rather than in a charge incorporating the transformer in the station. Thus, the half-wave voltage (rectified alternating voltage) is produced on the vehicle; and the SCR's control the actual voltage applied. This is an important aspect of the invention. This may be effected by an operator-controlled direct branch from just after test 178, FIG. 3 to transfer point 397, FIG. 16.

In the usual case, the voltage being applied to the vehicle will be within limits and an affirmative result of the test 443 will reach a pair of steps 451 where an interrupt timer is preset and a zero crossing interrupt is enabled. This is described more fully hereinafter. Then, a series of steps 452 measure the battery temperature through the battery status indicator 146 (FIG. 1), record the current measured by the charge current measuring circuit 143, calculates and stores the kilowatt hours and cost so far, and decrements the interrupt timer (which is preset in the step 451). Then, a test 453 determines if the current is in limits. If not, a pair of steps 454 cause the display to inform the operator that the current is out of limits and what the current is; then the vehicle charge computer reverts to the standby condition through the steps 449 and the transfer point 450, as described hereinbefore. Assuming that the current is within limits, an affirmative result of the test 453 will reach a test 455 to determine if the voltage is within limits. If not, a negative result of test 455 will reach a pair of steps 456 in which the display informs the operator that the voltage is out of limits and what the voltage is, and then the vehicle charge computer reverts to the standby condition as described.

If the voltage is within limits, an affirmative result of the test 455 will reach a test 457 which determines if cabin heat was indicated as being required, as described with respect to FIG. 5 hereinbefore. If it is, then a test 458 determines if the start time for cabin heat has been reached or not; if so, the cabin heaters are turned on in a step 460. If cabin heat is not required or it is not yet time for heat, a negative result of either test 457, 458 causes the cabin heaters to be turned off (just to be sure) in a step 459.

Then a test 461 determines if the interrupt timer (which is initialized by the preset in step 451 and decremented in the steps 452) has timed out or not. As is described with respect to FIG. 17 hereinafter, the time out can only occur if no zero crossings are being sensed in the charging voltage. If it has, a step 462 will cause the display to indicate a power interruption and the vehicle charge computer reverts to the standby mode, as described. In the normal case, test 461 will always be negative, reaching a test 464 which determines if the battery is fully charged (as indicated by the battery status indicator 146, FIG. 1). If so, a step 466 provides an indication that charge is complete. If not, a test 468 determines if the operator has left the charge/run switch closed, indicating that further charge is to occur. If not, the display will indicate (step 471) that the operator is leaving the charge station, and the vehicle charge computer will revert to a standby mode through the steps 449 and the transfer point 450, as described. If charging is to continue, an affirmative result of test 468 will reach a step 473 which causes the program to wait one second. As described hereinbefore, this is typically done by presetting a suitable counter and either advancing or down counting the counter until it reaches a terminal count or zero; or a decode could be used if desired. In any event, after one second, the program returns to the steps 452 where the temperature, amperage and voltage are again measured. The kilowatt hours and cost are calculated and the interrupt timer is decremented one more time.

Assuming that the power applied to the AC main 32 is 60 Hertz, with full wave rectification, zero volts should be reached once for every 8.33 milliseconds. Since the vehicle charge computer is operated totally asynchronously with respect to the incoming power, it is not known where, between the step 452 and the step 473, such will occur. For that reason, a zero crossing interrupt is utilized to sense when the incoming power is at zero, to allow the rectifier and battery charge control 121 to control the firing angle of the silicon control rectifier (SCR) that connects the power to the battery, thereby to fine tune the voltage being applied to the battery and to avoid any over temperature condition. It is therefore clear that there could typically be 120 zero crossing interrupts as the program of FIG. 16 advances from one passage through the steps 452 and the one second delay at step 473, through the next passage therethrough. Therefore, the interrupt timer will time out (providing an affirmative result at test 461) only in the event that power at the AC main 32 (FIG. 1) is interrupted for some number of seconds equivalent to the preset in the interrupt timer. In the normal case, power remains applied, and a zero crossing interrupt will occur approximately 120 times, mostly while the program of FIG. 16 sits in the waiting state at step 473, in each passage.

Figure 17:
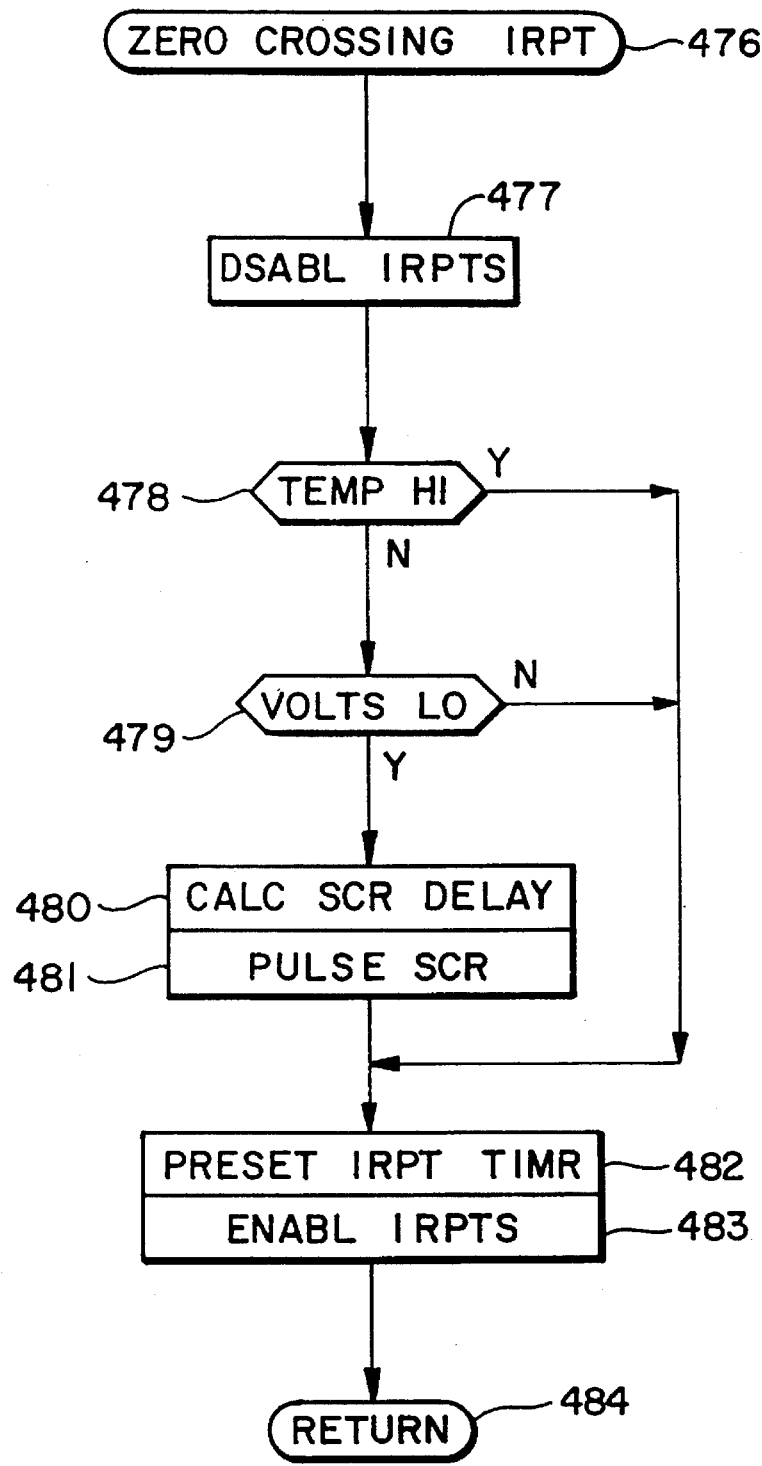

The zero crossing interrupt is illustrated in FIG. 17. Therein, when the rectifier and battery charge control 121 provides a signal on one of the lines 144 indicating that the incoming power voltage is at zero volts, an interrupt in the vehicle charge computer 72 will be reached through a transfer point 476. Then, a step 477 disables all interrupts so as to avoid interrupt nesting. A test 478 determines if the temperature is too high, as determined by the battery status indicator 146, and then a test 479 determines if the voltage is too low. If the temperature is not too high and the voltage is low, then a step 480 will calculate an SCR firing angle (delay) which will provide the proper voltage to the battery in comparison with its present state of charge. If the battery has a very low charge, then the SCR firing angle will be relatively high, applying close to full voltage to the battery. But when the battery approaches full charge, the firing angle is selected to be just sufficiently greater than the battery voltage so as to charge it slowly. This avoids over temperature conditions. Should the temperature rise, an affirmative result of the test 478 will avoid providing any pulse to the battery, thereby allowing the battery to cool off somewhat before charging is resumed. When the firing angle has been determined in the step 480, the SCR in the rectifier and battery charge control circuits 121 (FIG. 1) is pulsed in a step 481 thus applying charge to the battery. Following the charging steps, a step 482 will again preset the interrupt timer (in a sense resetting it and reinitializing it for a time down) in the same fashion as the presetting thereof in the steps 451, FIG. 16; then a step 483 reenables all of the interrupts in the vehicle charge computer 72 and the routine of FIG. 16 is reverted to, wherever it was, through a return point 484. In some embodiments, the rectifier and battery charge control 121 could be a high efficiency switch mode power supply, which is heavy and complicated, but yields less distortion at the power mains.

Figure 18:
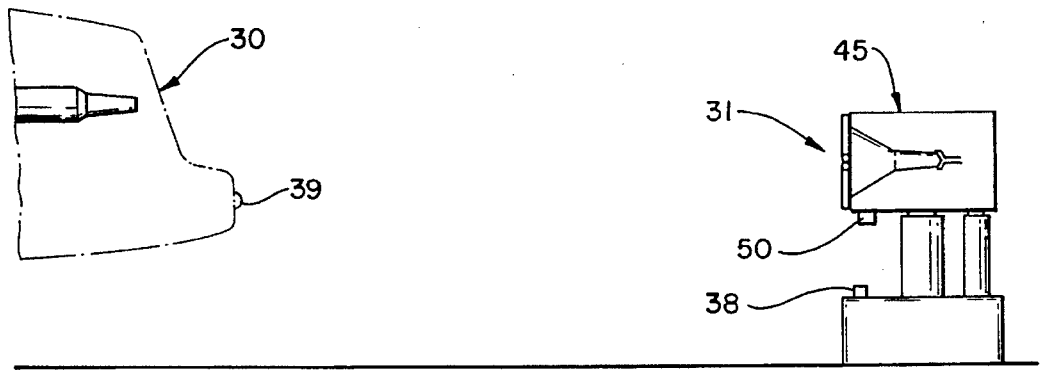
FIGS. 18–20 are illustrations of a vehicle approaching the station.

Referring now to FIG. 18, the vehicle 30 is shown as it approaches the charge station 31, which is quiescent and at rest with its charge head 45 in its lowest position. At this point in time, the charge station is cycling through negative results of test 161 in the computer stop mode (FIG. 2) waiting for a vehicle present interrupt. Just prior to or during this time, the vehicle is most likely cycling through negative results of test 178 (FIG. 3) waiting for the operator to decide it's time for a charge. As soon as the operator does move the charge/run switch 77 (FIG. 1) to the charge position, all the preliminaries of FIG. 4 and the top portion of FIG. 5 are accomplished and the infrared signal 39 (FIG. 1) is then turned on at step 208 of FIG. 5. Then the probe may be aimed to the right, to the left, or forward manually or by means of the motor 150 (FIG. 1) so as to point toward the charge station 31, and then the laser 51 is turned on at step 212 of FIG. 5. If the probe was not properly aimed (right, left, forward) some time might elapse between turning on the infrared signal and turning on the laser. The infrared signal causes the station computer (FIG. 6) to begin to look for the laser signal and therefore it may scan up and down before the laser signal is on.

Figure 19:
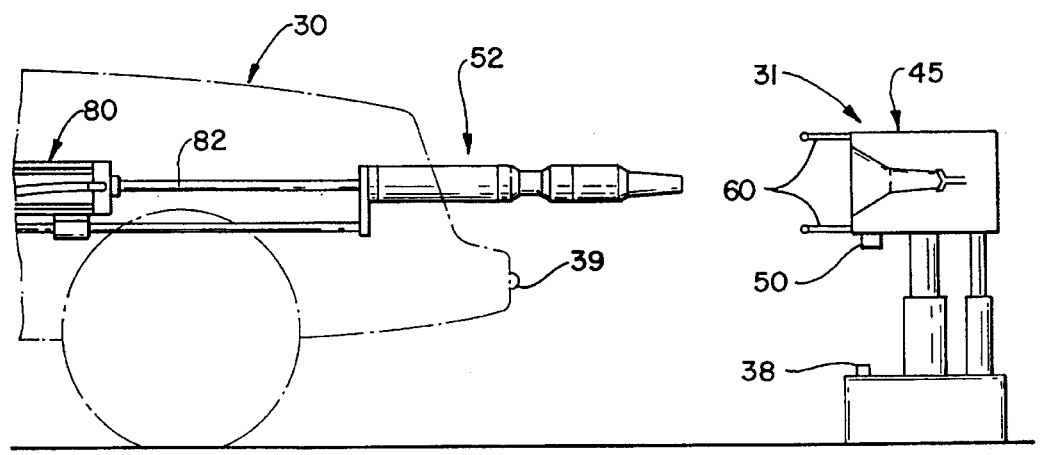

As seen in FIG. 19, the head 45 will normally quickly find the correct level by aligning the laser detector 50 with the laser diode 51 (FIG. 20), vertically. The probe begins to extend as shown in FIG. 19 (step 211, FIG. 5), just as the laser is turned on (step 212, FIG. 5).

Figure 20:
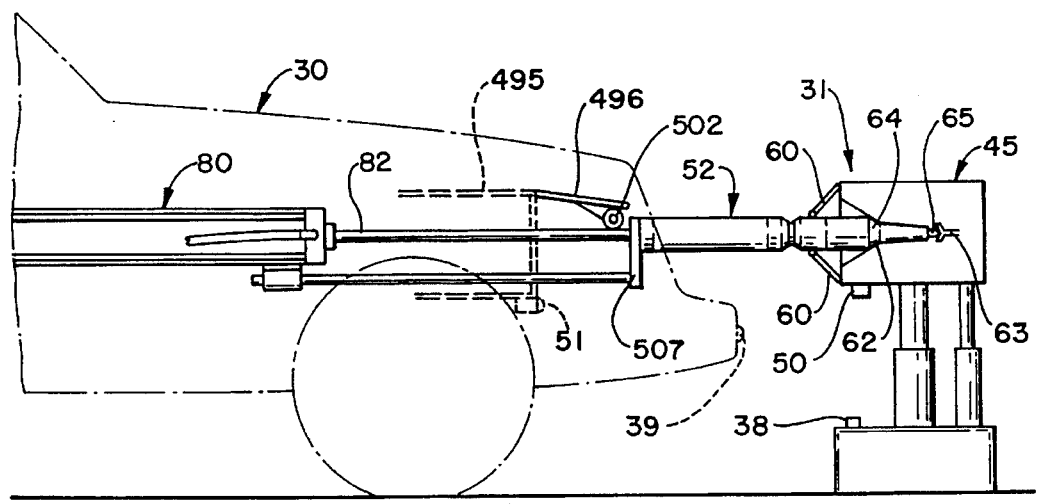

In FIG. 20, the probe is shown fully engaged with the head 45 so that the contacts 62, 64 and 63, 65 are properly connected. The precise moment of contact causes affirmative results of tests 276 (FIG. 7) and 277 (FIG. 8), as described hereinbefore. At this point in time, the vehicle 30 and charge station 31 begin to communicate with each other about the nature of the vehicle battery, the method of payment, and so forth, as described hereinbefore.

As the vehicle first approaches the charge station 31, the doors 60 thereof are closed, as seen in FIG. 18. As the probe begins to extend, and the driver is told to enter the station slowly (FIG. 19), the doors 60 have been fully opened as a consequence of step 254 in FIG. 6. As soon as the probe fully engages the receptacle (FIG. 20) the door solenoids are disenergized at step 289, FIG. 7, so that the doors partially close with the rollers 647 (FIG. 33) resting on the probe 52 as seen in FIG. 20. Since the doors are significantly wider than the probe 52, this provides some measure of protection for the probe as well as for the large frustoconical surface 608 (FIG. 31) in the head 45.

Figure 21:
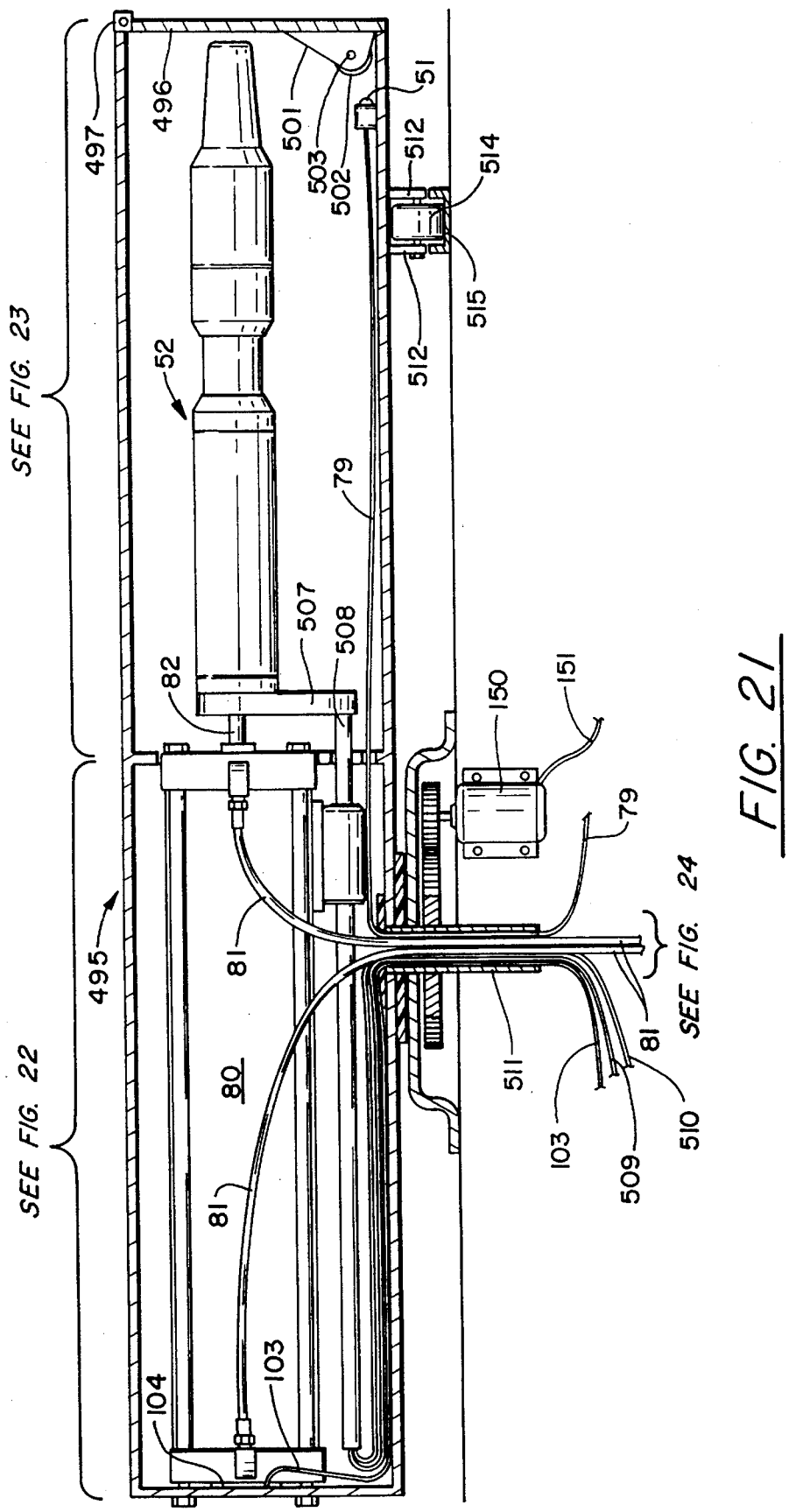
FIG. 21 is a side elevation view of a probe in accordance with the present invention.

In FIG. 21, the probe 52 and its low pressure pneumatic cylinder 80, which extends and retracts the probe, are shown disposed within a casing 495 (not shown hereinbefore) having a door 496 which is mounted to the casing 495 by a hinge 497. As the probe 52 extends, it will push the door 496 open, with the probe eventually contacting a ramp 501 which has a roller 502 mounted in a recess thereof by means of a pin 503. The roller 502 is disposed sufficiently deep within the ramp 501 so that contact of the end of the probe is essentially tangential (rather than normal) so that the end of the probe will not catch on the roller 502, but instead will easily ride under it. This feature also allows the roller 502 to ride up easily over a shell member 554 (FIG. 23) of the probe 52 as the probe, having been fully extended as seen in FIG. 20, begins to contract. In other words, the ramp and roller 501, 502 prevent the door from interfering with the extension and contraction of the probe 52. All of the parts 501–503 may be made of suitably rigid, self-lubricating plastic such as nylon, delrin or teflon, as desired.

In FIG. 21, a base member 507 is connected to a tube 508 which carries charging current conductors 509, 510 from within the probe 52 to a hollow pivot 511 which permits pointing the probe 52 to the right, to the left, or forward, while allowing easy passage of the pneumatic hoses 81 and the wires 79, 103, 509 and 510 therethrough. The casing 495 has a pair of brackets 512 disposed thereon with a pin 513 therethrough which rotatively supports a roller 514. The roller 514 is adapted to roll on a track 515 which, although shown as a C-shaped channel, may equally well be flat, if desired. The roller 514 should preferably be of a non-compressing material so as not to develop flat spots when at rest.

Figure 22:
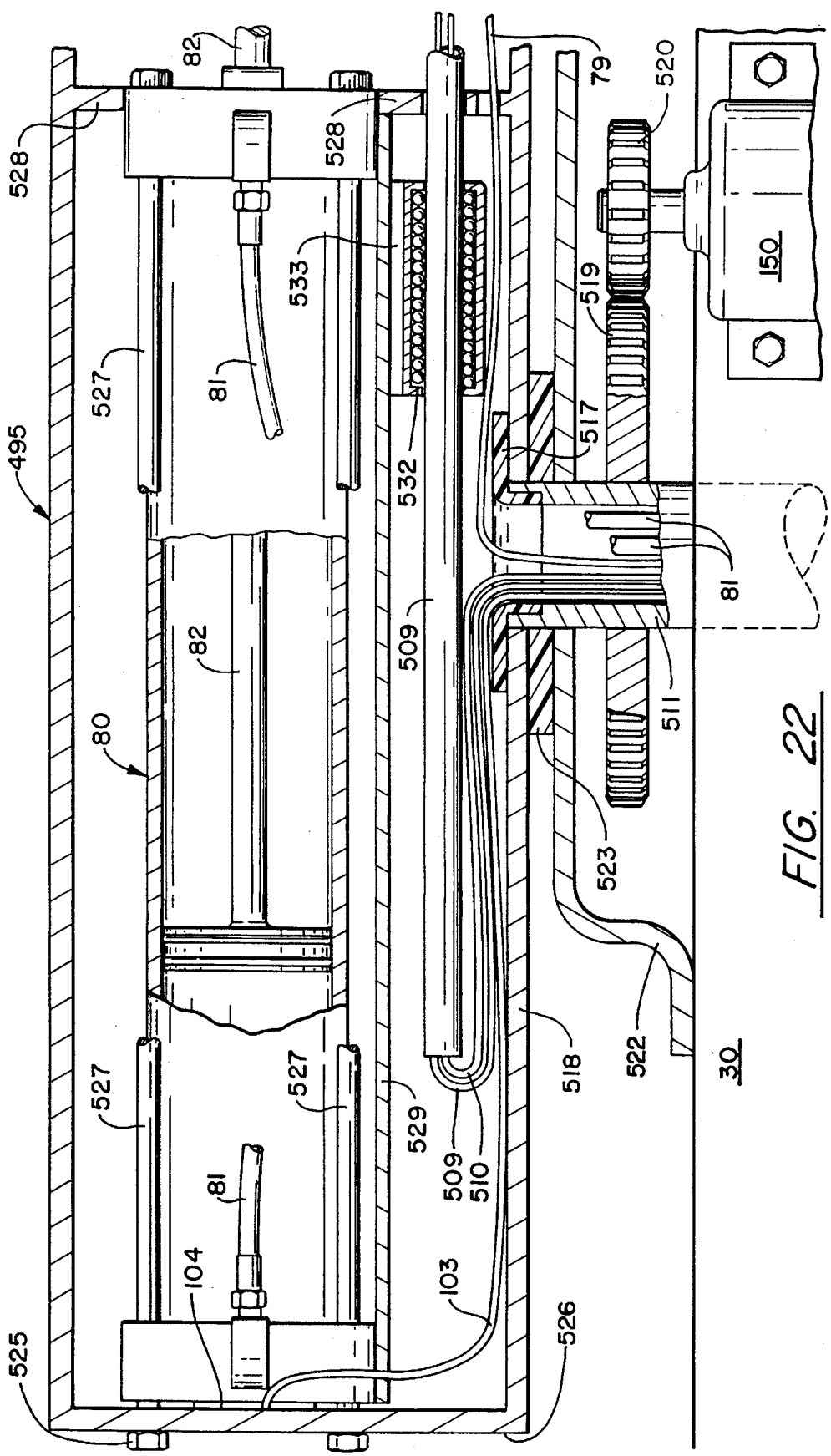
FIG. 22 is a more detailed side elevation view of portions of the probe of FIG. 21.

In FIG. 22, a hollow pivot 511 includes a flange 517 which is rigidly attached to the bottom wall 518 of the casing 495, and to a gear 519 which in turn is driven by a gear 520 disposed on the shaft of the motor 150. Thus, rotation of the motor will rotate the gear 519, the hollow pivot 511, the flange 517, and therefore the casing 495, so as to point the probe to the right, to the left, or forward. The casing 495 is provided vertical support by a dish shaped structure 522 which is disposed on the vehicle 30 in any suitable fashion, with a self-lubricating washer 523 disposed between the structure 522 and the bottom 518 of the casing 495. Other details of this structure are obvious and have been omitted for clarity.

The cylinder 80 is shown mounted to a rear wall 526 of the casing 495 by means of nuts 525 on threaded rods 527. The pressure sensor 104, which may comprise a readily available piezoelectric film such as an Interlink FSR, is disposed between the end of the cylinder 80 and the rear wall 526. When the probe contact 64 is pushing with sufficient force against the head contact 62, the pressure sensor 104 will undergo sufficient strain to provide a significant signal on the line 103 as described with respect to FIG. 1 and test 279 of FIG. 8, hereinbefore. This is what signals the beginning of the pre-charge communication process. The forward end of the cylinder 80 is shown loosely disposed in a cutout of a center wall 528 of the casing 495; however, it may as well be mounted through the wall 528 (assuming it is moved to the right as seen in FIG. 22) much in the same fashion as the manner in which the rear of the cylinder 80 is mounted to the rear wall 526. A stiffening wall or member 529 is illustrated in FIG. 22; however, this need not be utilized if it is not required in any implementation of the present invention. The tube 508 which supports the cables 509, 510 is disposed in a linear ball bearing 532 which is mounted to the bottom of the cylinder 80 by any suitable means such as an integral flange 533.

Figure 23:
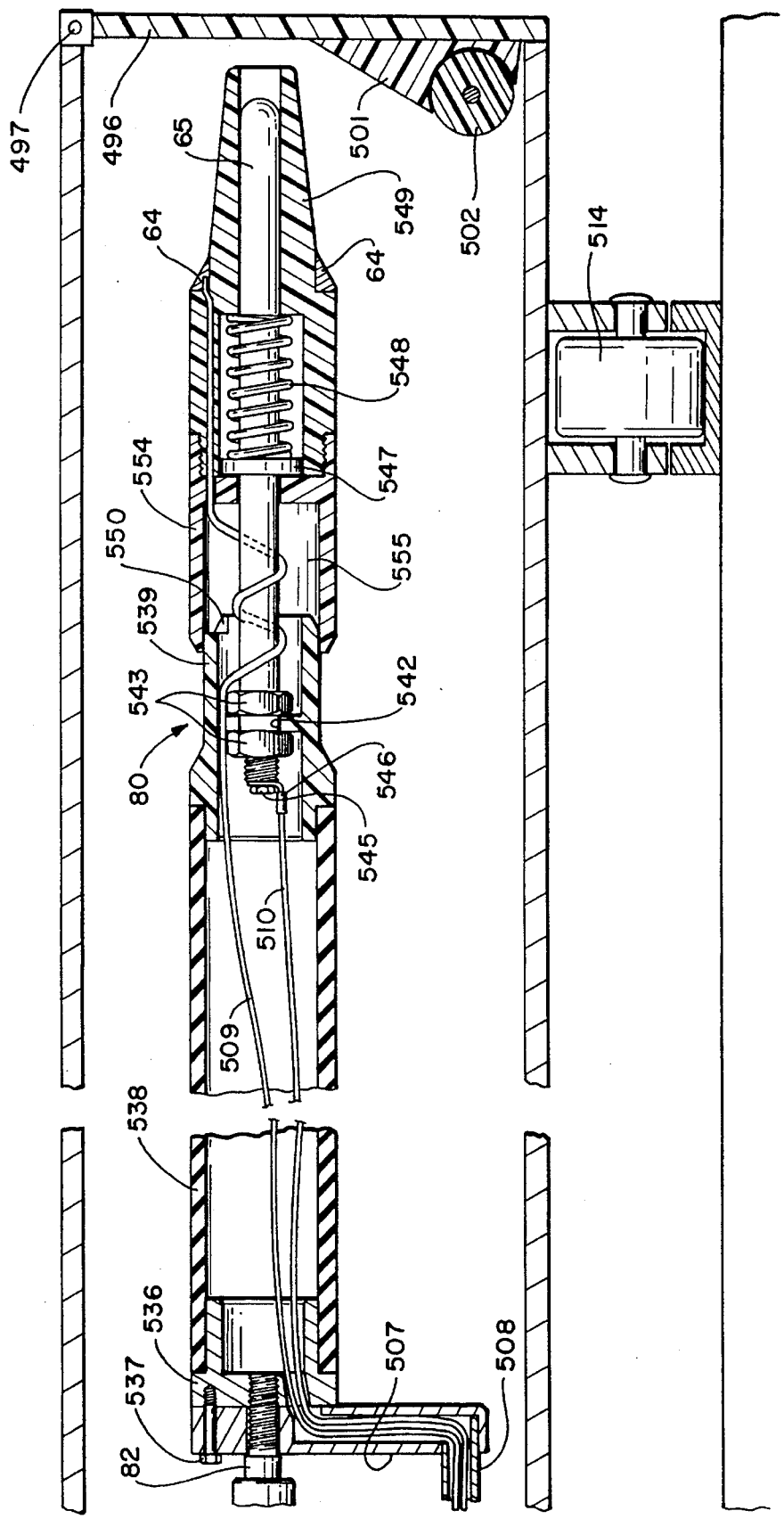
FIG. 23 is a more detailed side, section side elevation view of the probe of FIG. 21.
Figure 31:
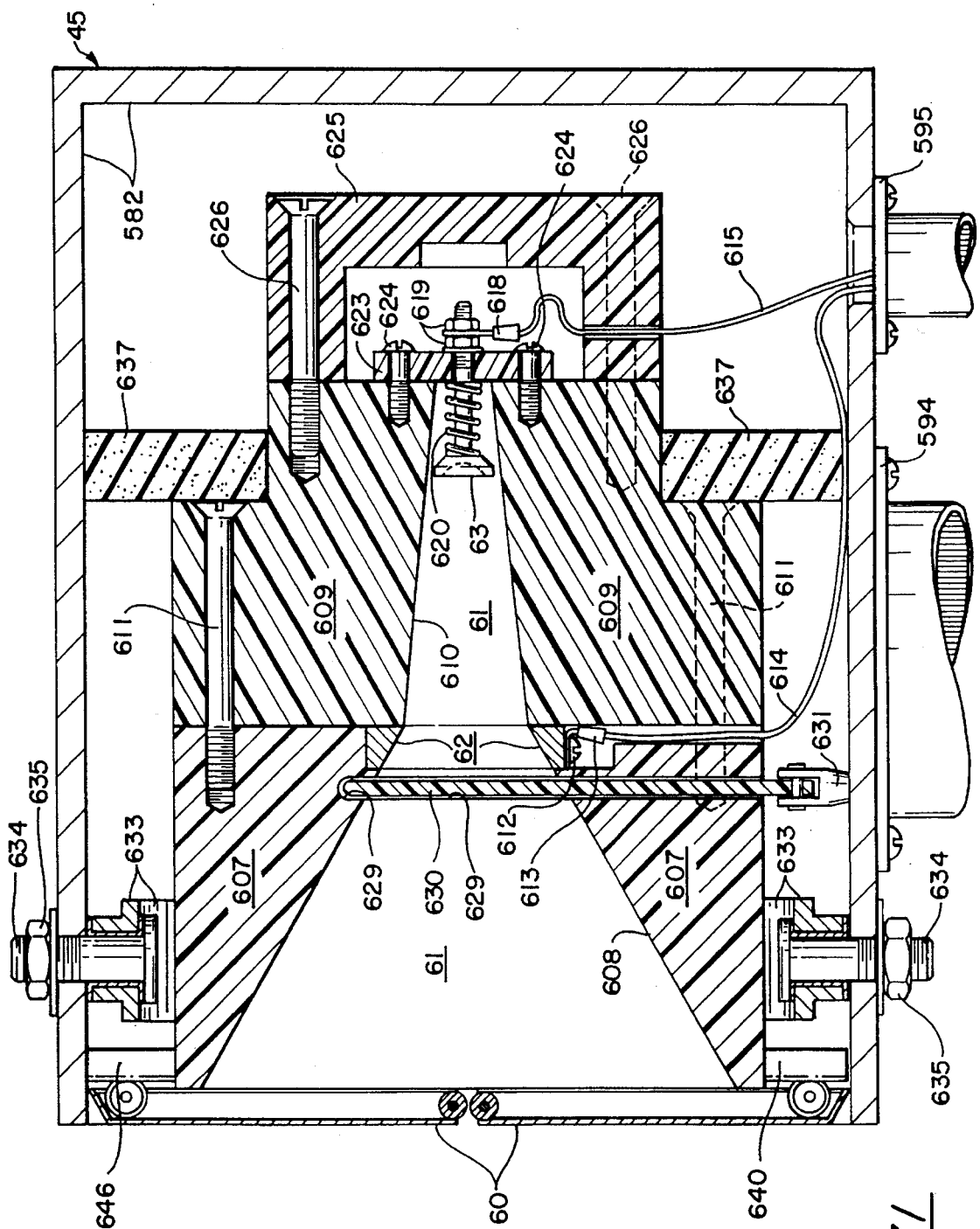
FIG. 31 is a detailed, partially sectioned side elevation view of a receptacle in accordance with the invention.

In FIG. 23, the base 507 of the probe 80 is fastened to a cylindrical plug 536 by any suitable means, such as bolts 537. A limber member 538 is forced over the plug 536; the limber member 538 should have sufficient rigidity so as to be able to support the probe 80 horizontally against its weight (as shown in FIG. 23) while at the same time being able to bend horizontally somewhat (and perhaps slightly vertically) to assist the probe 80 in mating with the head 45, as is described more fully hereinafter. The limber member 538 may for instance comprise EPDM (neoprene/rubber) tubing. It may, for example, be on the order of 1 ½ inch in diameter and approximately 10 inches long. The other end of the limber member 538 is forced over a cylindrical core 539, of a generally H-shaped cross section, which has a central bore 542 therein through which the central conductor 65 passes and is attached by nuts 543 threaded onto its proximal end. The proximal end also has a central threaded bore therein to receive a machine screw 545 which secures a terminal 546 to the central conductor 65 so as to connect the wire 510 thereto. The central conductor 65 has a flange 547 disposed thereon against which a compression spring 548 urges a shroud 549 outwardly so as to protect the distal end of the central conductor 65 from contact with anything prior to its engagement with the head 45. The annular contact 64 is disposed on the shroud 549 and has soldered or otherwise suitably bonded thereto the conductor of the wire 509. The wire 509 traverses a suitable passage in the shroud 549. The shroud 549 is threaded or otherwise rigidly connected to a shell 554 which is generally of a H-shaped cross section, as shown, and which has a cylindrical void 555 therein dimensioned so as to slide easily but not loosely over the outer surface of the core 539 whenever the shroud 549 is pushed inwardly (to the left in FIG. 23) against the action of the spring 548 as a result of contact between the ring conductor 64 and the annular conductor 62 (FIG. 31). All of the parts 539, 549, 554 may be made of suitably rigid, self-lubricating plastic such as nylon, delrin or teflon, as desired. The wire 509 is wrapped around the central conductor 65 a few times so as to take up the slack whenever the shroud 549 is moved inwardly. A notch 550 in the core 539 provides additional clearance for the wire 509 when the shroud 549 is at its leftmost position. When the shroud 549 is pushed sufficiently to the left (as seen in FIG. 23), a portion of the central conductor 65 will extend therefrom (such as on the order of an inch or less) thereby permitting the central conductor 65 to make contact with the central contact 63 of the head 45. The shroud 549 is pushed back over the central conductor 65, by being held in place against the annular contact 62 of the head 45 against the operation of the spring 548 and the pressure in the cylinder 80. In a sense then, the central conductor 65 has to reach out past the shroud 549 in order to make good, pressured contact with the central contact 63 of the head 45, as is described additionally hereinafter.

Figure 24:
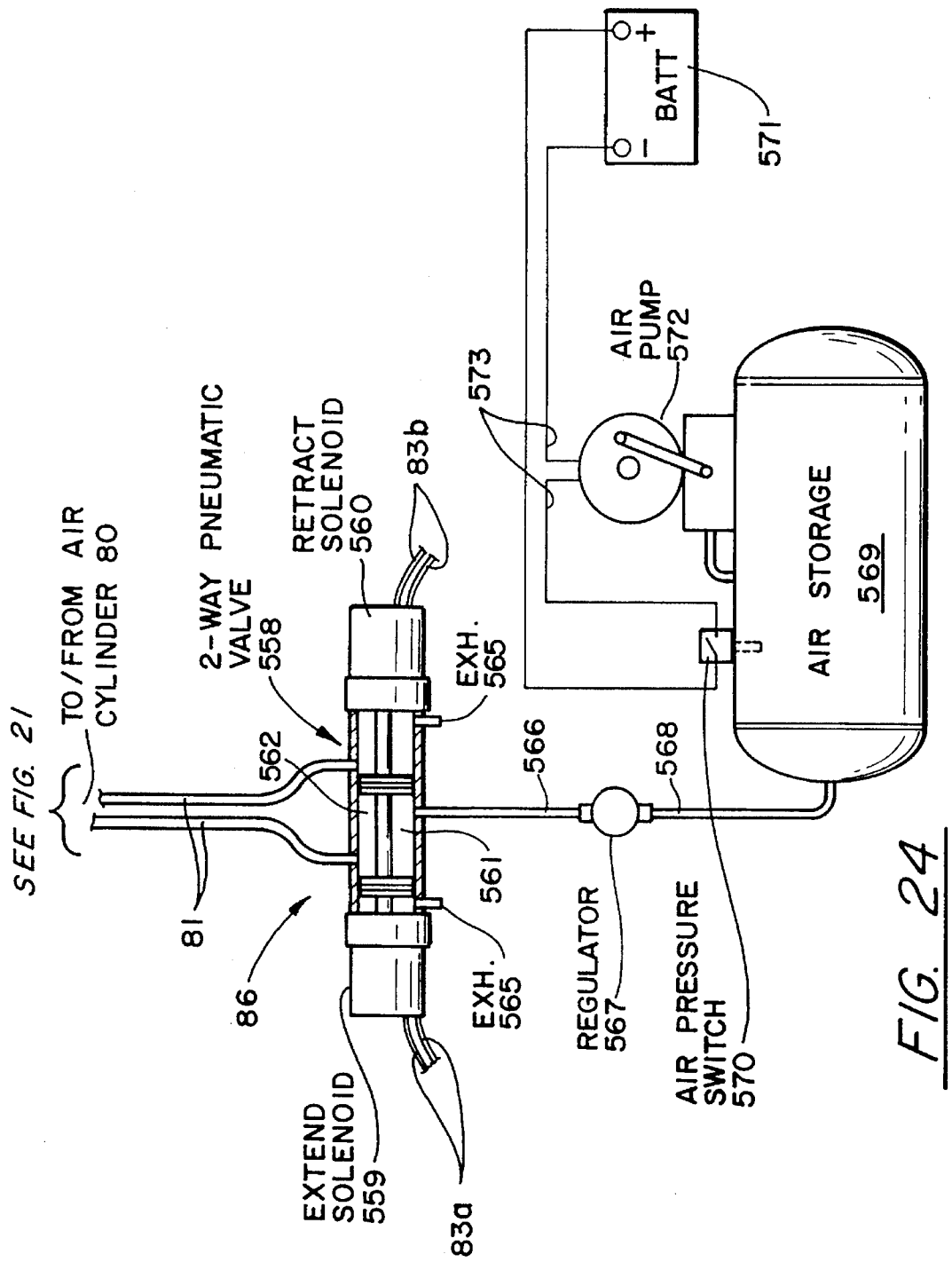
FIG. 24 is a schematic illustration of an air system for operating a pneumatic cylinder in accordance with the invention.

Referring now to FIG. 24, the probe extender cylinder control 86 includes a two-way, solenoid/air-operated pneumatic valve 558 connected to the wires 83, including an extend solenoid 559 connected to wires 83a and a retract solenoid 560 connected to wires 83b. The hoses 81 are connected to ports displaced along a cylinder 561 which contains a double piston 562, the ends of which are connected to the armatures of the solenoids 559, 560. The cylinder 561 has a pair of exhaust ports 565 and a pressurized air inlet port connected by a tube 566 to an air pressure regulator 567 which in turn is connected by a tube 568 to an air storage tank 569. The regulator 567 may be set at 15 psi, which with a 1¾ inch diameter cylinder will cause a probe force of about 35 pounds. The air storage tank 569 has disposed thereon an air pressure switch 570 which, when the pressure is insufficient (such as below 25 psi) will close, thereby connecting a battery 571 to an air pump 572 by means of circuits 573, in an obvious fashion. Operation of one of the solenoids 559, 560 will pull the piston 562 to one side or the other, after which the solenoid can be disenergized, because the cylinder 562 is at ambient pressure at both ends, so it is pressure neutral. Merely the friction between the interior wall of the cylinder 561 and the seals on the heads of the piston 562 will cause the valve to retain its position once placed there by either solenoid. The solenoid is shown in FIG. 24 in the extend position (as labeled).

Figure 25:
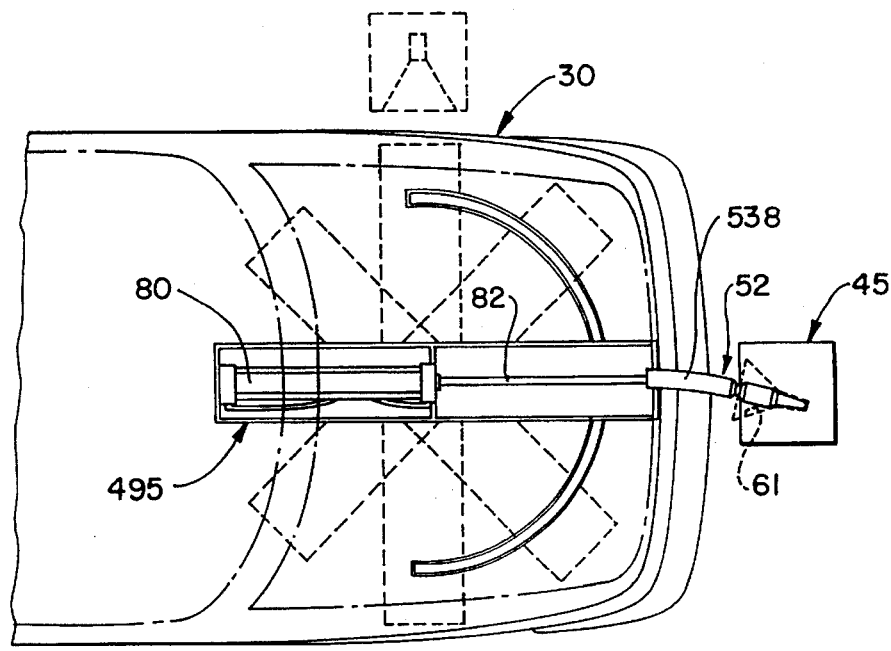
FIGS. 25–27 are top plan views of the vehicle probe mating with a station receptacle.
Figure 26:
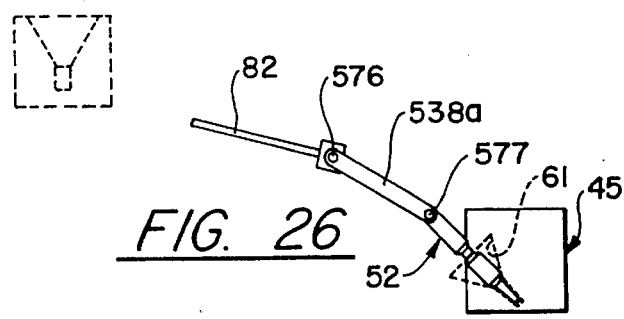
Figure 27:
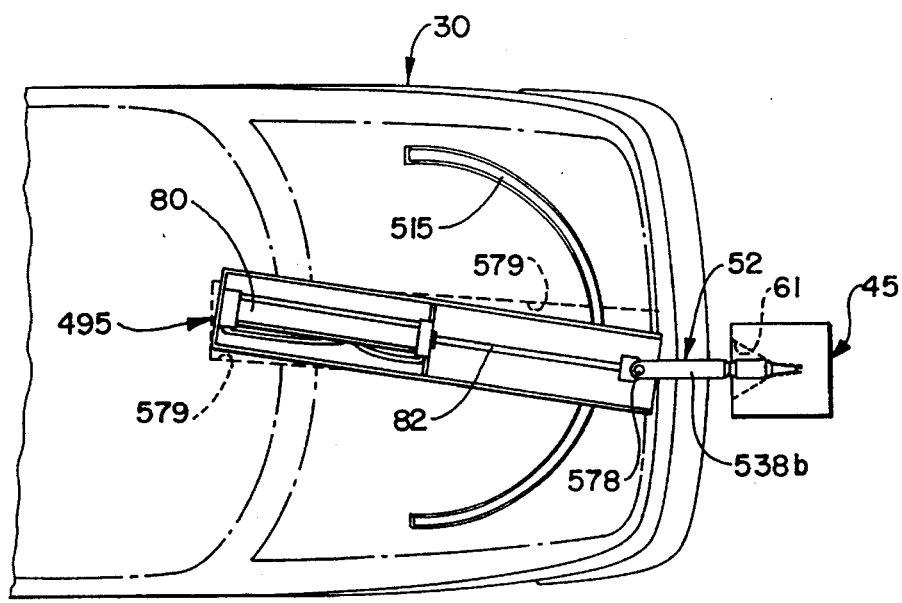

FIGS. 25–27 illustrate operation of the limber member 538 and show how the probe assembly (casing 495) can be pointed forward, to the right, to the left, or to any point in between. In FIG. 25, the probe is pointing directly forward, but is slightly offset from being aligned with the head 45. It is shown after it has contacted the funnel shaped charge receptacle 61 and rotated it, which in turn has pulled the limber member 538 into a curved shape in order to allow the probe 52 to extend fully into the head 45. A variation in the limber member 538 is illustrated in FIG. 26. Therein, in place of the limber member is a rigid member 538a which has swivel joints including vertical pins 576, 577 connecting it to the core 539 (FIG. 23) and the plug 536. Such a rigid member with vertical pins could perform the same function as the limber member 538 horizontally, and perhaps provide additional vertical strength. However, the limber member 538 accommodates some vertical misalignment, is very simple, has been demonstrated, and thus far is deemed suitable. As is seen in FIGS. 25 and 26, the probe has caused the receptacle 61 to rotate clockwise on its gimbal, in a manner described with respect to FIGS. 31 and 32 hereinafter.

Yet another option is illustrated in FIG. 27; in place of the limber member 538, a rigid member 538b is pinned only to the plug 536 by a vertical pin 578. FIG. 27 also illustrates that with suitably limber joints amongst the probe and the head, it is possible to point the probe at the head 45 (e.g., at a slight angle, rather than straight ahead) before it is extended, and thereafter, as the probe enters the head, it will cause its proximal end (at the joint with the rod) to move even further from the center of the vehicle. Thus as seen in FIG. 27, the dotted lines 579 indicate the original direction in which the probe was pointed before it was extended in order to make contact with the head 45, and, as the probe entered the head 45, the casing 495 was rotated further clockwise (to the right of the vehicle) so as to permit the probe to continue to enter the head 45. FIG. 27 also illustrates that a limber and rotating probe can align itself with a head 45 having a non-rotating receptacle 61, if desired. Also, a rigid probe that rotates as in FIG. 27 can align with a rotatable head. If the entire probe assembly is not rotationally neutral about the hollow pivot, it may be provided with a latch of some sort to prevent inadvertent motion during travel of the vehicle. In an embodiment using any pivots 576–578, a spring restoring force or a cupboard-hinge gravity detent (not shown), or the like, should be provided to restore the probe to its center position—or nearly so. Comparison of FIG. 21 and FIG. 27 might suggest that the probe would have to pass through a wheel or a strut if pointed to the right or the left. However, the vehicle details are not presented herein: indeed, each vehicle type will have a different configuration in which to arrange a probe or a receptacle.

Figure 28:
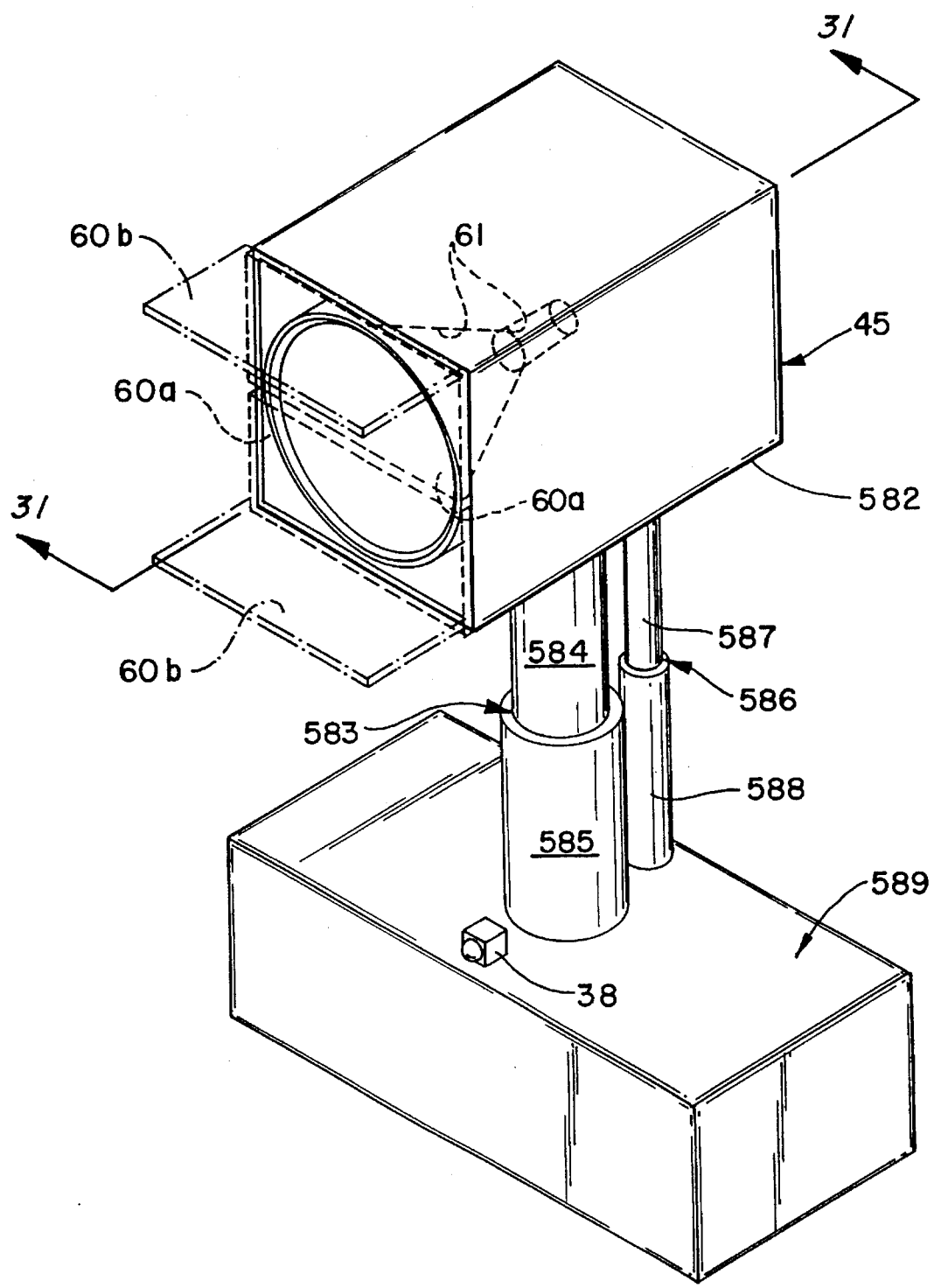
FIG. 28 is a perspective view of charge station and receptacle of the invention.

Referring now to FIG. 28, the head 45 includes a case 582 to which the doors 60 are hinged. In FIG. 28, the doors 60 are shown in dotted lines in the closed position 60a and shown by dashed lines in the open position 60b. The case 582 is disposed to a telescoping stanchion 583 which includes an upper smaller tube 584 that slides within a lower, larger tube 585. In order to stabilize the case 582 as it is being raised and lowered (as described with respect to FIGS. 29 and 30 hereinafter), there is also provided a telescoping guide tube 586 which includes a smaller tube 587 that slides up and down within a larger tube 588. The stanchion 583 and guide tube 586 are disposed on a main base 589. The infrared detector 38 is disposed at the front center of the top of the base 589. The guide tube 586 also serves as a conduit for wires extending between the head 45 and the base 589.

Figure 30:
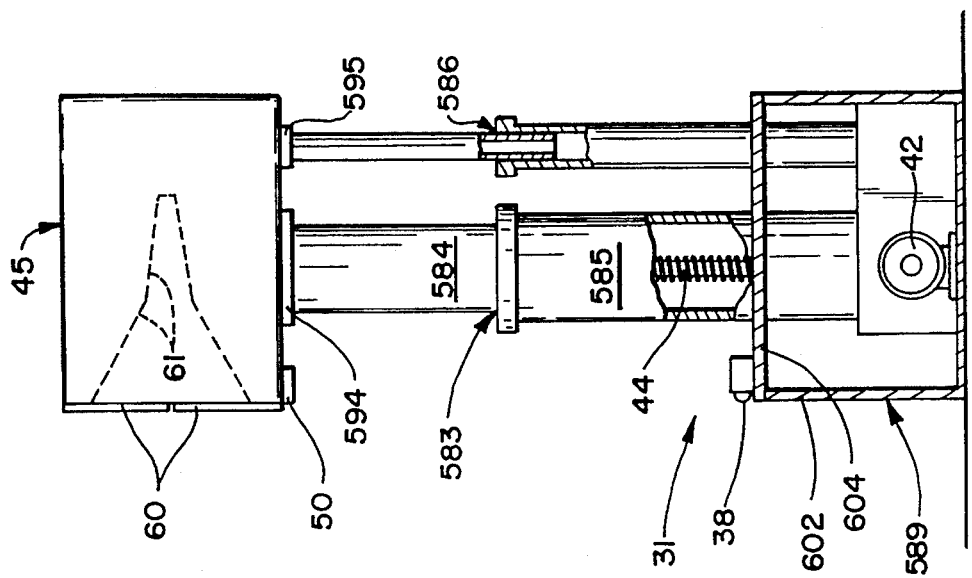
FIG. 30 is a side elevation view of a charge station of the invention.
Figure 29:
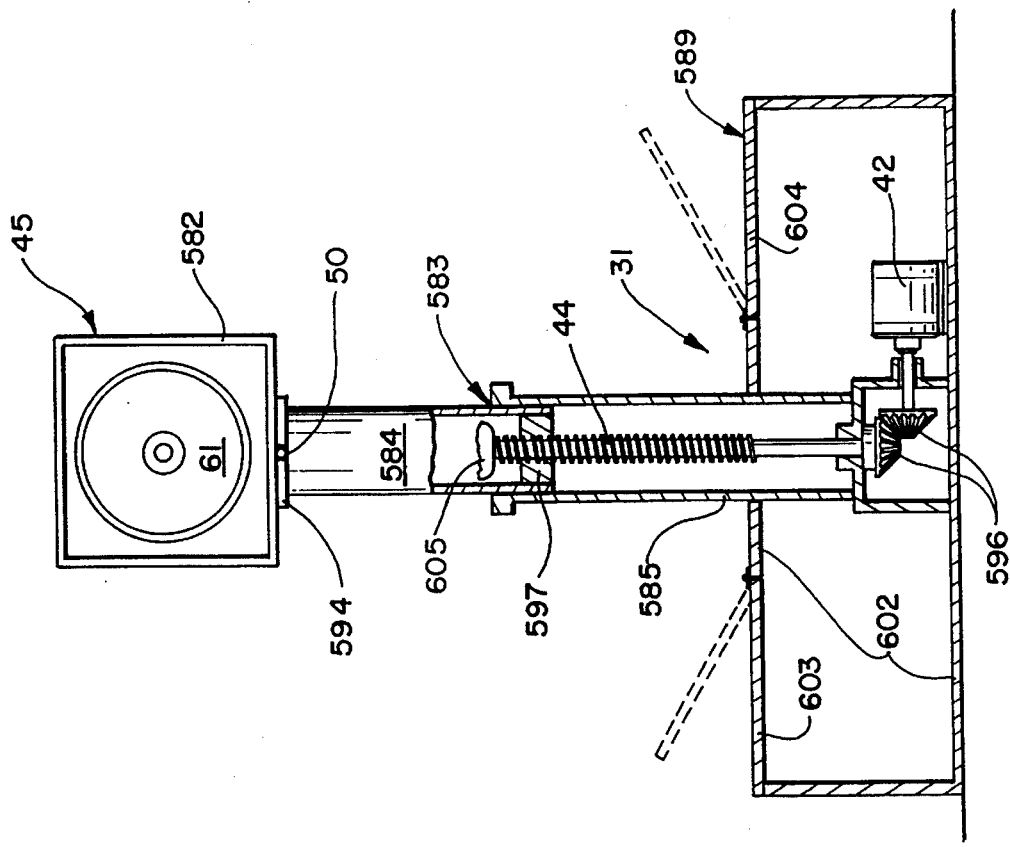
FIG. 29 is a front elevation view of a charge station of the invention.

Referring now to FIGS. 29 and 30, the embodiment of charge station 31 disclosed herein is designed to be useful in a variety of environments, such as at the rear of a private garage or as essentially a parking meter type installation in public and commercial parking lots. In FIGS. 29 and 30, the case 582 is secured to the stanchion 583 and the stabilizing tube 586 by means of corresponding flanges 594, 595. The jack screw arrangement 44 which is operated by the motor 42 through a pair of pinion gears 596 includes a threaded plug 597 fixed within the tube 584. Because the head 45 cannot rotate due to the guide tube 586 (FIG. 30), rotation of the pinion gears 596 will cause the plug 597 to ride upwardly or downwardly (depending upon the direction of rotation). The base 589 may include a case 602 having doors 603, 604 in the top thereof which may be opened as shown by dotted lines in FIG. 29. The electronics (FIG. 1) of the station 31 may be mounted in the case 602, or indeed, on the inner surfaces of the doors 603, 604 for ease of maintenance. Or, everything could be mounted within the stanchion 583 (if made of a large enough diameter), including drive motor, both transformers, and all electronics. If desired, the tube 584 can be made slightly smaller than the tube 585 so as to permit the use of self-lubricating plastic sleeves at the inside of the top of the tube 585 and the outside of the bottom of the tube 584 so as to reduce friction while maintaining stability. The same can be achieved in the guide tube 586. The jackscrew 44 may have a freely-rotating head 605 (to close a security gate 630, FIG. 31).

Referring to FIG. 31, the funnel-like receptacle 61 comprises a front piece 607 having a large frustoconical cavity 608 therein and a rear piece 609 having a substantially smaller frustoconical cavity 610 therein. The pieces 607, 609 may be joined together in any suitable fashion such as by screws 611. The pieces 607, 609 may have a square, round or any other outside shape (being shown as round in FIG. 32 hereinafter). The pieces 607, 609 may comprise any electrically insulative material such as teflon, polypropylene or phenolic, as suits any implementation of the present invention. Within the piece 607, the annular contact 62 is disposed. The piece 607 also has a notched out clearance for a screw 612 which secures a terminal 613 in order to connect the conductor of a wire 614 to the annular contact 62. Similarly, the conductor of a wire 615 is disposed in a terminal 618 which is secured by nuts 619 on a threaded distal end of the central contact 63. The central contact 63 is urged outwardly (to the left in FIG. 31) by a compression spring 620. The central contact 63 is disposed to the rear piece 609 by means of an insulative piece 623 which is secured thereto by screws 624. If desired, although it is not necessary, the rear of the central contact 63 may be protected by a shell of insulating material 625 which may be secured to the rear block 609 by means of bolts 626.

The receptacle 61 need not be funnel shaped; the cavity 610 is not needed at all. The cavity 608 must have the ability to guide the probe in, but it could be a frustoprism, or frustoconoid, etc.; the term "frustoconoid" herein means any suitable, steering shape.

Figure 32:
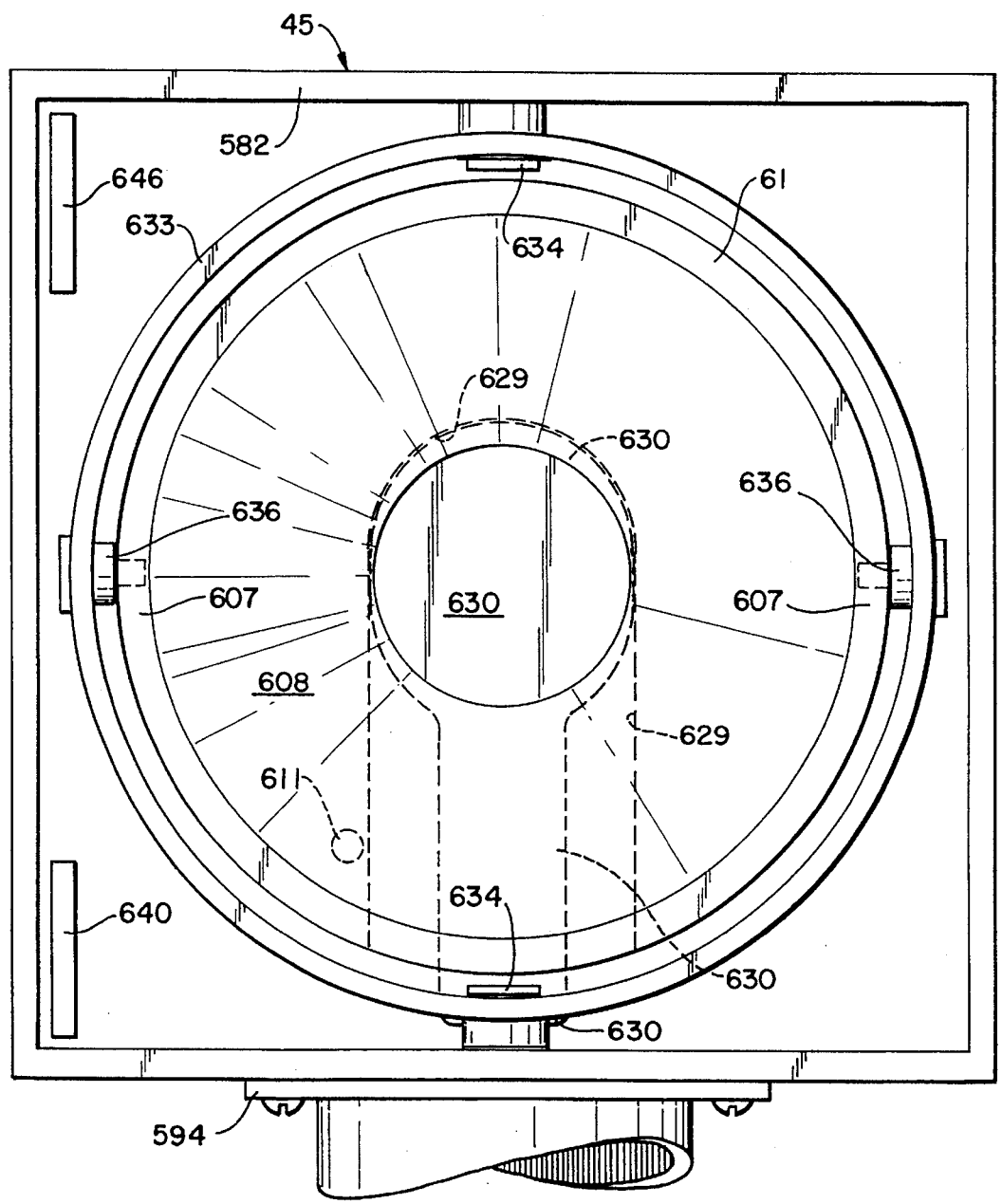
FIG. 32 is a front elevation view of a receptacle in accordance with the invention.

Referring now to FIGS. 31 and 32, within the front piece 607 there is a thin, wide, vertically extending slot 629 within which a paddle-like security gate 630 is free to slide relatively upwardly and downwardly. The cavity 608 has been made up of laminations; the slot 629 may be formed in the surface of a lamination before assembly. When the head 45 is in its lowermost position (as in FIG. 18), the security gate 630 extends up to essentially the top of the slot as seen in FIG. 31. As the head 45 raises upwardly to seek the correct level for connection with the probe, the security gate 630 is prevented from rising simply by the force of gravity. If the gate is not sufficiently heavy to ensure that it will remain in place as the head 45 rises, it may be coupled to a rod 631 (FIG. 31) to add weight thereto; the rod 631 is pushed upward by the rotatable head 605 (FIG. 29). To prevent the security gate 630 from falling all the way out of the slot and not being able to align with it for reentry, the gate is not permitted to slide all the way out in some suitable fashion; for instance, one of the bolts 611 (FIG. 32) can pass through the slot 629 at a point which is below the security gate when it is in a lowered position and has totally opened the large frustoconical surface 608. Other suitable details may be selected as desired to suit any implementation of the present invention. The security gate ensures that there will be essentially no pollution of the contacts 62, 63 when the station is not in use. The doors 60, in turn, protect the surfaces of the frustoconical surface 608 and also protect the security gate 630.

The funnel-like receptacle 61 is mounted within the case 582 by means of a gimbal shown in FIGS. 31 and 32. A gimbal yoke 633 is secured to the case 582 by vertical pivots 634 which are threaded to receive nuts 635 (shown in FIG. 31 but not in FIG. 32). The gimbal yoke 633 also has horizontal pivots 636 fastened thereto (FIG. 32) which extend into bores within the front piece 607, thereby supporting the front edge of the funnel-like receptacle 61. If desired, the rear edge may be resiliently supported such as by means of sponge rubber 637, or the like (FIG. 31). Alternatively, a tension spring could be disposed between the rear of the funnel-like receptacle 61 and the top wall of the case 582 to provide a measure of vertical support, while allowing the funnel-like receptacle 61 to rotate about the horizontal pivots 636, if necessary.

Figure 33:
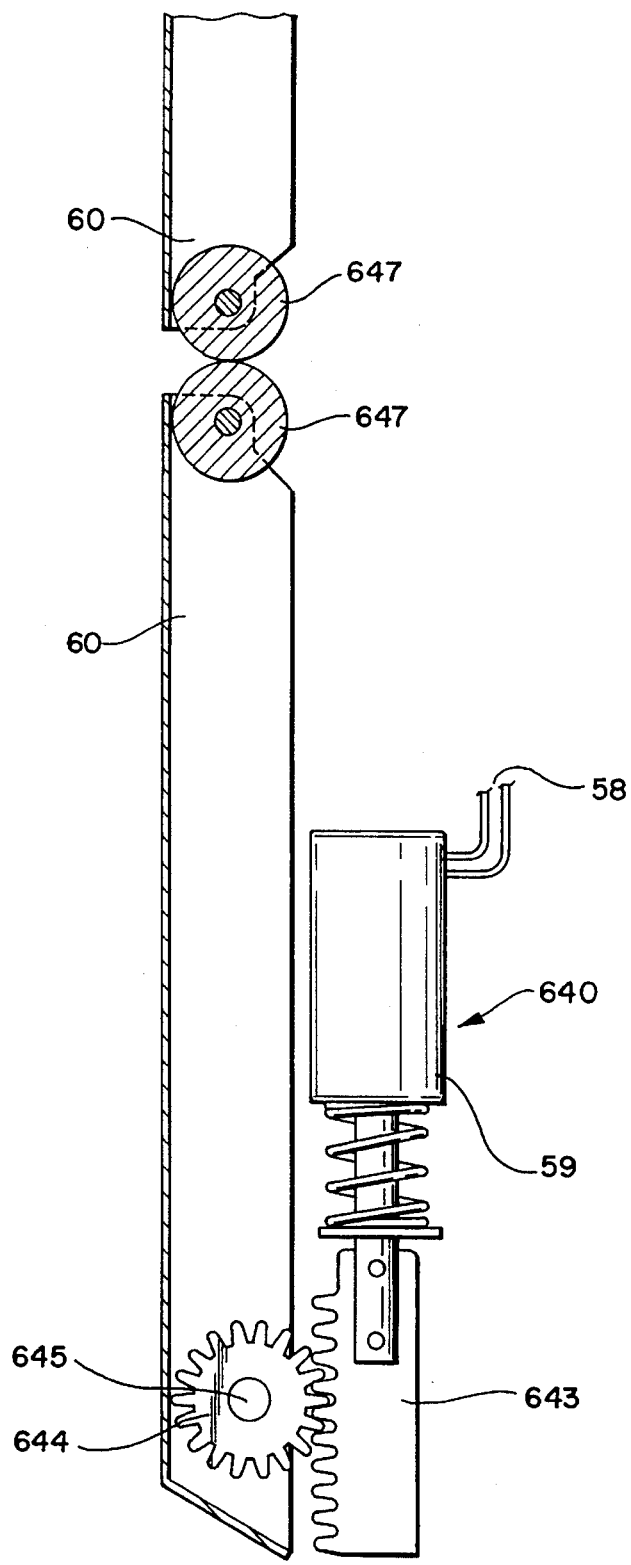
FIG. 33 is a schematic illustration of a door operating mechanism in accordance with the invention.

Referring now to FIG. 33, a door operating mechanism 640 for the lower one of the receptacle doors 60 includes the solenoid 59 which is energized by signals on the lines 58 to pull an armature 641 against the force of a compression spring 642 thereby raising a rack 643 which will rotate a gear 644 counterclockwise, causing the lower door to open. The gear 644 is in fixed relationship with the door 60. A rod 645 may join the gear 644 with the door 60 and extend throughout the door to journal the door in suitable holes within the case 582 of the head 45. The positioning of the door operating mechanism 640, and a similar door operating mechanism 646 for the upper one of the receptacle doors 60, within the head 45 is illustrated generally in FIGS. 31 and 32. Each of the doors 60 has a roller 647 thereon so as to permit easy retraction of the probe 52.

The embodiment herein has the connections between the vehicle and the station including a probe on the vehicle and a receptacle on the station. This has the advantage of permitting human assistance in pointing the probe toward the receptacle; pointing a vehicle-mounted receptacle toward a station probe will not provide as much accommodation for poor driving—poor alignment of the vehicle with the station. On the other hand, providing a receptacle on the vehicle should conserve precious vehicle space. A probe on a station could be swung into a vertical position when not in use, if desired.

Figure 34:
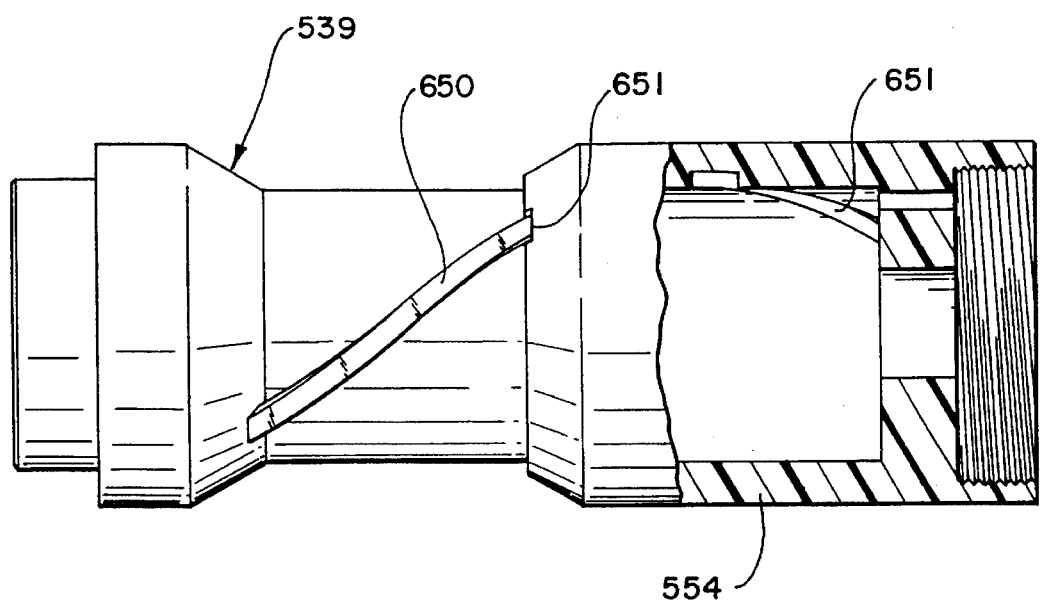
FIG. 34 is a partially sectioned side elevation detail of a probe shroud rotating embodiment of the invention.
Figure 35:
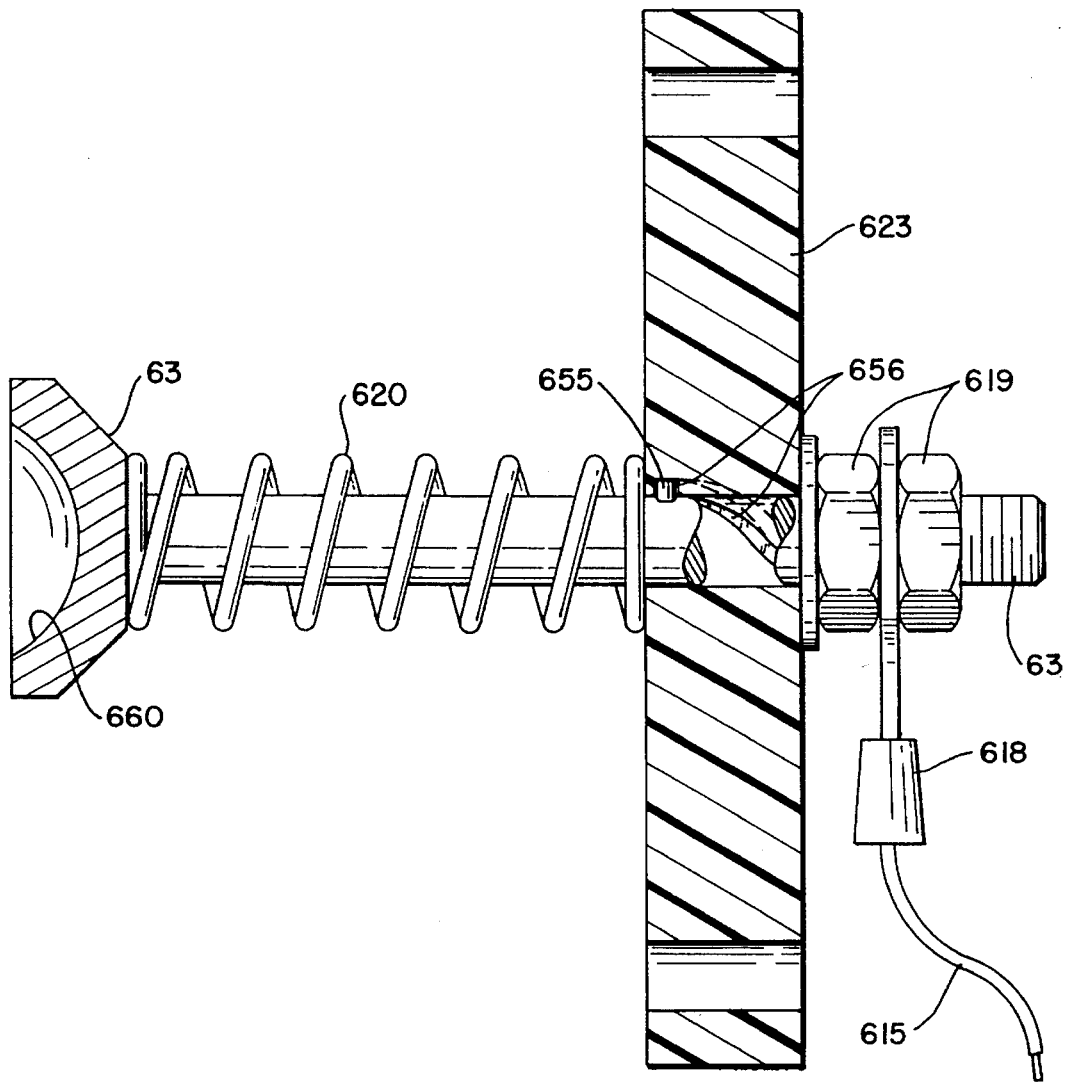
FIG. 35 is a detailed, partially sectioned side elevation view of a center contact capable of rotating in accordance with the invention.

An additional feature of the present invention is illustrated in FIGS. 34 and 35 in conjunction with FIGS. 23 and 31. In FIG. 23 it can be seen that if pressure is applied to push the contact 64 to the left in the figure, that will cause the shroud 549 to compress the spring 548 and allow the shroud and the attached shell 554 to slide to the left over the core 539. Not shown in FIG. 23, but illustrated in FIG. 34, the core 539 has a single male thread 650 formed thereon which will engage with a corresponding female cam surface such as a track or thread 651 formed on the inside of the shell 554. The threads 650, 651 have a very steep pitch so that as the shell 554 moves toward the left over the core 539, the threads will cause the shell 554, and therefore the shroud 549, to rotate less than one turn (a quarter of a turn should be more than sufficient). This will cause the contacts 64 (FIG. 23) to wipe the surface of the contacts 62 (FIG. 31) to ensure a good ohmic connection.

In a similar fashion, not shown in FIG. 31, the central contact 63 can be caused to rotate so as to provide a similar wiping contact with the central conductor 65 of the probe 52 by means of a single male pin or stud 655 disposed on the central contact 63 which engages a female cam surface such as a track or thread 656 disposed in the insulative piece 623. Thus, the pressure exerted between the contacts 62, 64 will cause both the shroud 554 (FIG. 23) and the central contact 63 (FIG. 31) to move, and by so doing, to impart a wiping contact between both sets of contacts. If desired, more than a single thread or cam may be used on the central contact 63 and/or on the core 539. In fact, the use of a stud in place of the male thread 650 in FIG. 34 may be preferred, as well. Furthermore, the camming action on the probe could be created between the central conductor itself and the shroud: for instance, a good arrangement may have a female thread cam in the shroud 549 and a metallic pin extending radially outward from the proximal end of the central conductor 65 so as to cause the shroud to rotate slightly as it is pushed back on the central conductor thereby causing the contact 64 to wipe on the contact 62. However, the threads need not be used if they are not desired in any implementation of the invention. Of course, the position of the male thread and female threads may be reversed, if desired. In FIG. 35, the dished out portion 660 of the central contact 63 is also illustrated.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A system for charging the batteries of electric vehicles, comprising:

a charge station to which a vehicle may be presented to receive an electric charge, said charge station including a source of charging voltage;

a vehicle charging system including charge control circuits disposed on an electric vehicle that has a battery for supplying motive energy to the vehicle; and apparatus for establishing a connection between said charge station and said charging system when said vehicle is presented to said station to receive a charge;

wherein the improvement comprises:

a cabin heater operable in response to said charging voltage when said vehicle is connected to said station to heat the interior of said vehicle.

2. A system according to claim 1 wherein said vehicle provides an operator induced manifestation of the time of day when heating of the vehicle should begin and operates said heater only after said time of day.

3. A method of heating an electric vehicle while it is at a charging station to have its battery charged, comprising:

providing a display requesting an operator to input an indication as to whether cabin heat is required in the vehicle during the time that the vehicle is at a charging station to receive a charge;

in the event that said indication is that cabin heat is required, providing a display requesting an operator to input a manifestation of the time of day at which heating should commence; and when the vehicle is connected to receive charging voltage for its battery, providing said charging voltage to said heaters in the event that said indication has been provided that heat is required and the current time of day is after the time of day of said manifestation.

4. A system for charging the batteries of electric vehicles connected to said system with power derived from an AC main, comprising:

a charge station to which a vehicle may be presented to receive an electric charge, said charge station including a source of charging voltage which includes an adjustable transformer responsive to said AC main for providing an AC charging voltage suitable to be rectified for charging the batteries of a vehicle connected thereto;

a vehicle charging system including charge circuits disposed on an electric vehicle that has a battery for supplying motive energy to the vehicle, said charge circuits including a rectifier responsive to said AC charging voltage for providing DC power for charging said battery;

apparatus for establishing a connection between said charge station and said charging system when said vehicle is presented to said station to receive a charge thereby to provide said AC charging voltage to said electric vehicle; and a cabin heater operable in response to said AC charging voltage when said vehicle is connected to said station to heat the interior of said vehicle.

5. A method of heating an electric vehicle, having heaters and a rectifier, while it is at a charging station to have its battery charged, comprising:

providing, to said charging station from said vehicle, battery information indicative of the voltage requirement for charging said battery;

providing a display requesting an operator to input an indication as to whether cabin heat is required in the vehicle during the time that the vehicle is at a charging station to receive a charge;

in the event that said indication is that cabin heat is required, providing a display requesting an operator to input a manifestation of the time of day at which heating should commence; and when the vehicle is connected to said charging station to receive charging voltage for its battery, providing, in response to said battery information, an AC charging voltage from said station to said vehicle, providing said charging voltage to said rectifier to rectify said charging voltage for application to said battery to charge it, and providing said charging voltage to said heaters in the event that said indication has been provided that heat is required and the current time of day is after the time of day of said manifestation.

6. A method of heating the passenger compartment of an electric vehicle, in which the only source of energy on board said vehicle while said vehicle is in operation is DC electric power from a motive power battery, comprising:

providing an electrically operated passenger compartment heater in said electric vehicle;

in the event that cabin heat is to be provided in said electric vehicle, providing in said electric vehicle a manifestation of the time of day at which heating should commence; and periodically presenting said vehicle to a charging station for connection to a source of charging voltage for charging said motive power battery; and providing said charging voltage to said heater in the event that heat is to be provided and the current time of day is after the time of day of said manifestation, only when the vehicle is connected to receive said charging voltage for its battery.

* * * * *